United States Patent [19]

Chande et al.

[11] Patent Number: 5,212,738

[45] Date of Patent: May 18, 1993

[54] SCANNING LASER MEASUREMENT SYSTEM

[75] Inventors: Alhad M. Chande, Columbia; Arthur Acampora, Jr., Abingdon, both of Md.

[73] Assignee: Martin Marietta Magnesia Specialties Inc., Hunt Valley, Md.

[21] Appl. No.: 684,092

[22] Filed: Apr. 12, 1991

[51] Int. Cl.$^5$ ............................................. G06K 9/00
[52] U.S. Cl. ........................................ 382/8; 356/376; 356/381; 358/107; 364/563
[58] Field of Search ............... 356/376, 381; 358/101, 358/107; 382/1, 8; 364/507, 563

[56] References Cited

U.S. PATENT DOCUMENTS

| | | | |
|---|---|---|---|
| 4,025,192 | 5/1977 | Scholdstrom et al. | 356/152 |
| 4,107,244 | 8/1978 | Ochiai et al. | 264/30 |
| 4,131,914 | 12/1978 | Bricmont | 358/100 |
| 4,227,802 | 10/1980 | Scholdstrom et al. | 356/5 |
| 4,508,448 | 4/1985 | Scholdstrom et al. | 356/5 |
| 4,708,482 | 11/1987 | Neiheisel | 356/376 |
| 4,893,933 | 1/1990 | Neiheisel et al. | 356/376 |

FOREIGN PATENT DOCUMENTS

| | | |
|---|---|---|
| 0121617 | 10/1984 | European Pat. Off. |
| 0310244 | 4/1989 | European Pat. Off. |
| 61-134611 | 6/1986 | Japan |
| 63-264266 | 11/1988 | Japan |
| 64-73013 | 3/1989 | Japan |

OTHER PUBLICATIONS

P. Besl, "Range Imaging Sensors", Research Publ. No. GMR-6090, General Motors Research Labs., Warren, Mich. (Mar. 8, 1988).
R. Chin et al., "Model-Based Recognition and Robot Vision", ACM Computing Surveys, vol. 18, No. 1, pp. 67-108 (Mar. 1986).
W. Hibbard et al., "Visualizing Large Data Sets in the Earth Sciences", IEEE Computer, pp. 53-57 (Aug. 1989).
T. Kanade et al., "Noncontact Visual Three-Dimensional Ranging Devices", Proc. SPIE Conf. on 3-D Machine Perception, vol. 283, pp. 48-53, Apr. 1981.
R. Measures, *Laser Remote Sensing: Fundamentals and Applications*, Wiley Interscience Publications, ISBN 0-471-08193-0, 1984.
J. Miya, "Aesthetics Meets Functionality", Electronic Engineering Times, pp. 60-61, Apr. 1, 1991.
R. A. Jarvis, "A Laser Time-of-Flight Range Scanner for Robotics Vision", IEEE Trans. Pattern Anal. Mach. Intell., vol. 5, pp. 505-512, Sep. 1983.
M. Oshima et al., "Object Recognition Using Three-Dimensional Information", IEEE Trans. Pattern Anal. Mach. Intell., vol. 5, pp. 353-361, Jul. 1983.
Patent Abstracts of Japan, vol. 14, No. 294 (C-732) 26 Jun. 1990 & JP,A,2 093 013 (NKK Corp.) 3 Apr. 1990.

*Primary Examiner*—Leo H. Boudreau
*Attorney, Agent, or Firm*—Burns, Doane, Swecker & Mathis

[57] ABSTRACT

A scanning measurement system comprises a device for imaging an object, wherein the imaging device generates a plurality of data values representing distances from the imaging device to respective points on the object, and a device for processing the data values generated by the imaging device, wherein the processing device comprises a device for entering a predetermined 2½-D mathematical model of the object, and a device for comparing the data values to the model to determine the object's thickness.

20 Claims, 20 Drawing Sheets

| e, DEGREES/SECONDS | ERROR TOLERANCE ALONG FURNACE SURFACE D (i=120 DERGEES) | | |
|---|---|---|---|
| | 1/10" | 3/10" | 1/2" |
| 20 ft. | .02067 / 74 | .06198 / 223 | .103267 / 372 |
| 40 ft. | .01034 / 37 | .03100 / 111 | .05166 / 186 |
| 60 ft. | .00689 / 25 | .02067 / 74 | .0344 / 124 |

(DISTANCE TO FURNACE SURFACE R)

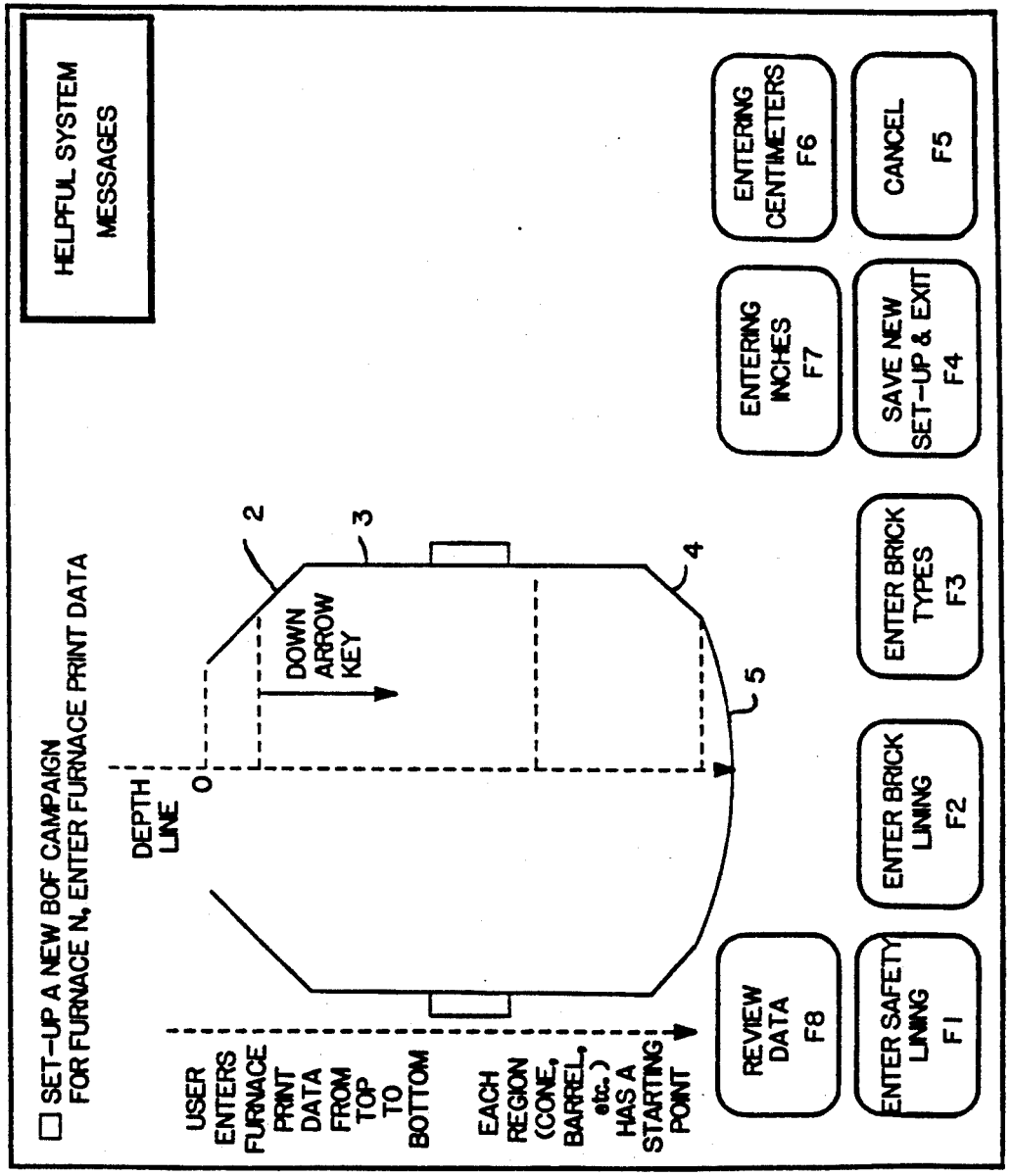

SCANNING LASER MEASUREMENT SYSTEM

BACKGROUND

The present invention relates to a system for remotely measuring the thickness of vessel linings by use of a scanning laser imager. The invention may be used to inspect the interior of refractory-lined vessels such as those used in metallurgical processing and other applications.

The walls of steel furnaces and other vessels used in steel and metal making are typically covered by refractory linings made of bricks. For example, a basic oxygen furnace (BOF) for steel making is typically formed from three shells: an inner working lining of bricks, a middle safety lining also of bricks, and an outer shell usually of steel, and the inner and working linings together are usually about three feet thick. The working lining undergoes uncontrolled and unpredictable wear during steel processing, and to maintain safe and economical production rates, the linings must be only periodically inspected to ascertain their remaining thickness.

Among the systems currently available for measuring the linings of such vessels are those described in U.S. Pat. No. 4,131,914 to Bricmont; and U.S. Pat. No. 4,107,244 to Ochiai et al. These patents describe measurement systems in which a probe, i.e., either a television camera or a microwave sensor, is inserted into the vessel to be measured. The environment within such vessels, which may typically have a temperature of 1,700° C., imposes stringent construction requirements on such sensors. In addition, the vessels to be measured must typically be rotated or otherwise moved to allow the sensors to be inserted. Such motions can interfere with and delay metal processing.

The lining measurement system described in U.S. Pat. No. 4,708,482 to Neiheisel also uses a probe inserted into the vessel to be measured. In the Neiheisel patent, the probe directs a continuous-wave laser light beam at the refractory lining, and a thickness displacement is measured by a self-scanned linear detector array. The signal received by the linear array provides information for mapping the worn or damaged areas of the vessel lining so that such areas may be repaired, for example, by a gunning spray nozzle. Although using a laser, the Neiheisel system suffers from disadvantages similar to those of the foregoing Bricmont and Ochiai et al. systems in that a probe must be inserted into the hot interior of the vessel.

The vessel lining measurements systems described in U.S. Pat. No. 4,893,933 to Neiheisel et al. and U.S. Pat. Nos. 4,508,448 and 4,227,802 to Scholdstrom et al., also use a laser time-of-flight phase measurement technique to determine vessel wall position and thickness, but in these three patents, no probe is inserted into the hot interior of the vessel. In these systems, the vessels are either manually or electromechanically scanned, and each system is carefully aimed at a small number of points at predetermined locations on the vessel surface.

In the Neiheisel et al. system, the apparatus is mounted on a portable cart which can be wheeled into proximity to an open furnace vessel. A laser transmitter directs a laser light beam toward the furnace lining, and the light beam scattered from the vessel is received by a self-scanned linear detector array and correlated by a computer to provide a graphical representation of actual remaining lining thickness. Pneumatically operated locating members cooperate with positioning pads in the floor adjacent the vessel to be measured to accurately and repeatably position the portable cart with respect to the furnace coordinates. The systems described in the two Scholdstrom et al. patents operate in a generally similar fashion.

Since thickness measurements must be made at various times with minimal disruption during the course of a metal making campaign, a useful measurement system must provide data that is located quickly and accurately with respect to the vessel. For example, the Scholdstrom and Scholdstrom et al. systems described above base their lining characterizations on roughly 100 data points that are obtained via a laborious and slow process that is complicated by the necessity of aiming the laser beam in precisely the same directions for each furnace measurement.

In contrast, the present application describes a measurement system employing a scanning light time-of-flight imager and a data processor to enhance the accuracy of the thickness data developed and to reduce the time needed for its collection. The present system is capable of measuring 500,000 range data points for each furnace measurement in seconds and accommodates the finite angular accuracy of its imager by employing a $2\frac{1}{2}$-D surface-patch modelling process. Even if the prior measurement systems permitted collecting 5000x as many points without lengthening the measurement period impractically, the build up of errors in the measured positions would render the prior systems useless. The present system needs only two minutes for calibrating its position, and collects 30,000 range and reflectance points per second.

SUMMARY

In one aspect, the present thickness measurement system comprises means for imaging an object, wherein the imaging means generates a plurality of data values representing distances from the imaging means to respective points on the object, and means for processing the data values generated by the imaging means, wherein the processing means comprises means for entering a predetermined $2\frac{1}{2}$-D mathematical model of the object, and means for comparing the data values to the model to determine the object's thickness.

In another aspect, the processing means of the present thickness measurement system further comprises means for storing a plurality of thicknesses determined by the comparing means from respective data values generated by the imaging means from respective locations of the object with respect to the imaging means, and the comparing means compares the plurality of thicknesses.

In another aspect, the comparing means comprises means for establishing an object reference coordinate system, and means for calibrating the imaging means's location with respect to the object in the object reference coordinate system.

BRIEF DESCRIPTION OF THE DRAWINGS

The features and advantages of the present invention will be better understood after reading the following detailed description in conjunction with the drawings in which:

FIGS. 11A-11C are operator menus for entering a furnace set-up model.

DETAILED DESCRIPTION

Figure 1A:
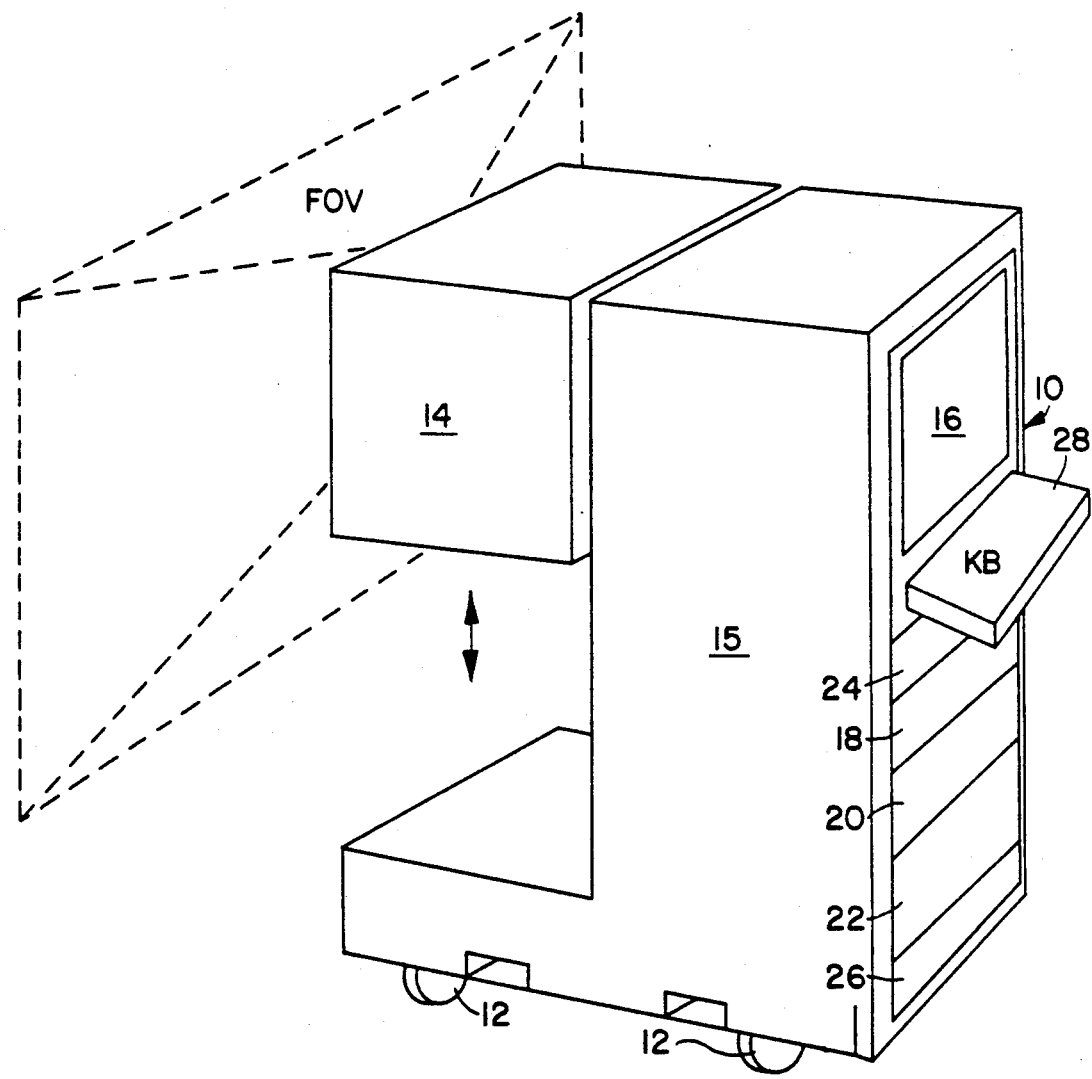
FIG. 1A is a perspective view of the present measurement system.
Figure 1C:
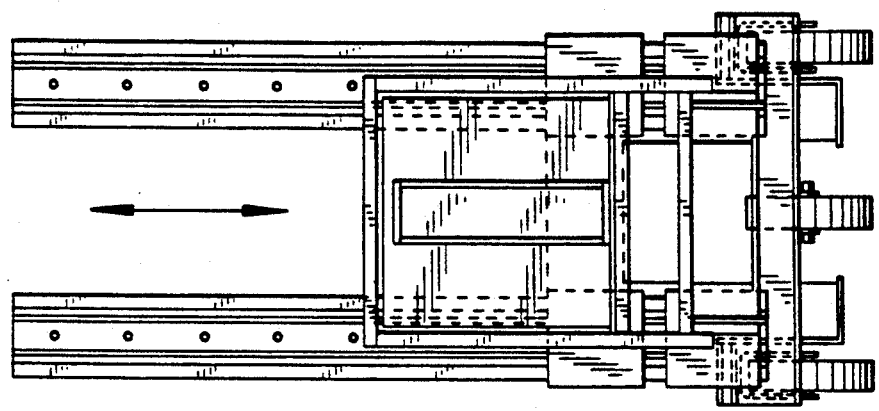
FIGS. 1B and 1C are side and front views respectively of the present measurement system.
Figure 1B:
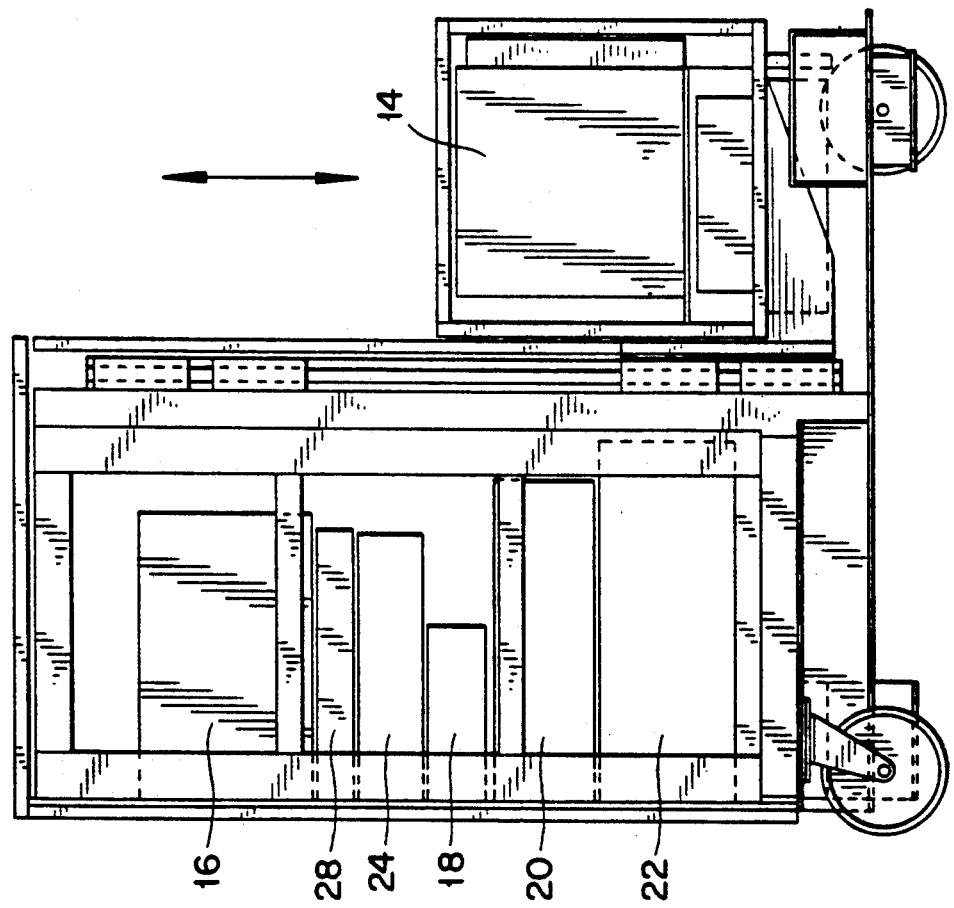

Referring to the figures in which like reference numerals indicate like structures throughout, FIG. 1A shows a perspective view of the present measurement system 10. The system is advantageously configured in a portable rack that may be moved on suitable wheels 12. The system 10 generally comprises a laser scanner and shutter module, or imager, 14 and supporting equipment 15. As seen from FIG. 1A, the supporting equipment typically would comprise a video color display monitor 16, a line printer 18, a 300-dot-per-inch color image printer 20, a central processing unit 22, interfacing electronics 24, and an electronics cooling module 26. A keyboard or other command entry means 28 is also provided. The system may be seen more clearly from the side in FIG. 1B and from the front in FIG. 1C.

The portability of the system 10 facilitates positioning the system with respect to the furnace or vessel so that the entire interior is measured. Ordinarily, three positions displaced horizontally have been used to ensure adequate measurement of the sides of the furnace. To achieve the same for the upper and lower portions of the furnace, the laser scanner and shutter module 14 may be moved to several different heights in a range of about two to five feet with respect to the base of the equipment rack, as indicated by the double-headed arrows in the figures. In addition, the scanner and shutter module 14 can be mounted separately from support equipment 15 and connected thereto via a cable so as to maximize the system's flexibility of use.

One suitable laser scanner system 14 is a LIDAR II model commercially available from Perceptron of Farmington Hills, Mich. Such a laser scanner generally comprises an amplitude-modulated imaging laser radar having a 80 mW laser operating at 840 nm, with a 7 mm-diameter beam scanned through a 160×90 variable field of view (FOV), and a 0.18 inch range resolution. In such amplitude-modulated rangers, a transmitted laser signal is reflected from a target surface back to a detector, such as a silicon avalanche photodiode (APD). The optical signal is filtered to pass only the transmitted optical frequency, and the electronic detector signal is filtered to pass only the amplitude modulating frequency. An electronic phase detector then measures the phase difference between the transmitted signal and the received signal, which is proportional to the target distance; in addition, target reflectance information can be collected.

Since relative phase differences can only be determined modulo $2\pi$, the measured range to a point is only determined to within a range ambiguity interval, unless other factors are used to resolve that ambiguity. Hence, in the absence of any ambiguity resolving mechanisms, the guaranteed depth of field of an AM laser radar is the ambiguity interval, which is usually divided into $2^N$ range levels, where N is the number of bits of quantization at the output of the phase detector. Laser imaging sensors for range measurements are described in several publications, including P. Besl, "Range Imaging Sensors", Research Publication No. GMR-6090, General Motors Research Laboratories, Warren, Mich. 48090 (Mar. 8, 1988).

The laser imager used in the present measurement system provides a 512×512 full frame in about eight seconds, and generates 32,768 range points and 32,768 reflectance points per second. The imager's X-Y resolution is 5×5 inches for a maximum range of 60 feet. These values correspond to an angular accuracy of 25 arcseconds for the scanner. With the present system, the total time for collecting one furnace scan is less than 10 minutes. It will be appreciated that depending on the range and orientation between the imager and the furnace not all of the data points may be useful, e.g., represent the interior lining. In practice, the useful number of points would be expected to vary between about 50,000 and 150,000 depending on the FOV chosen.

The laser system includes a two-mirror scanning system by which the laser beam is scanned in a repeatable pattern, although the worst-case accuracy at 60 feet of the repeated patterns is limited to 5×5 inches as described above. The mirror scanner is generally conventional, being comprised of a reciprocating plane mirror and a rotating faceted mirror. Various aspects of laser imaging and optical scanning techniques are set forth in R. Measures, "Laser Remote Sensing: Fundamentals and Applications", Wiley Interscience Publications, ISBN 0-471-08193-0.

Figure 2A:
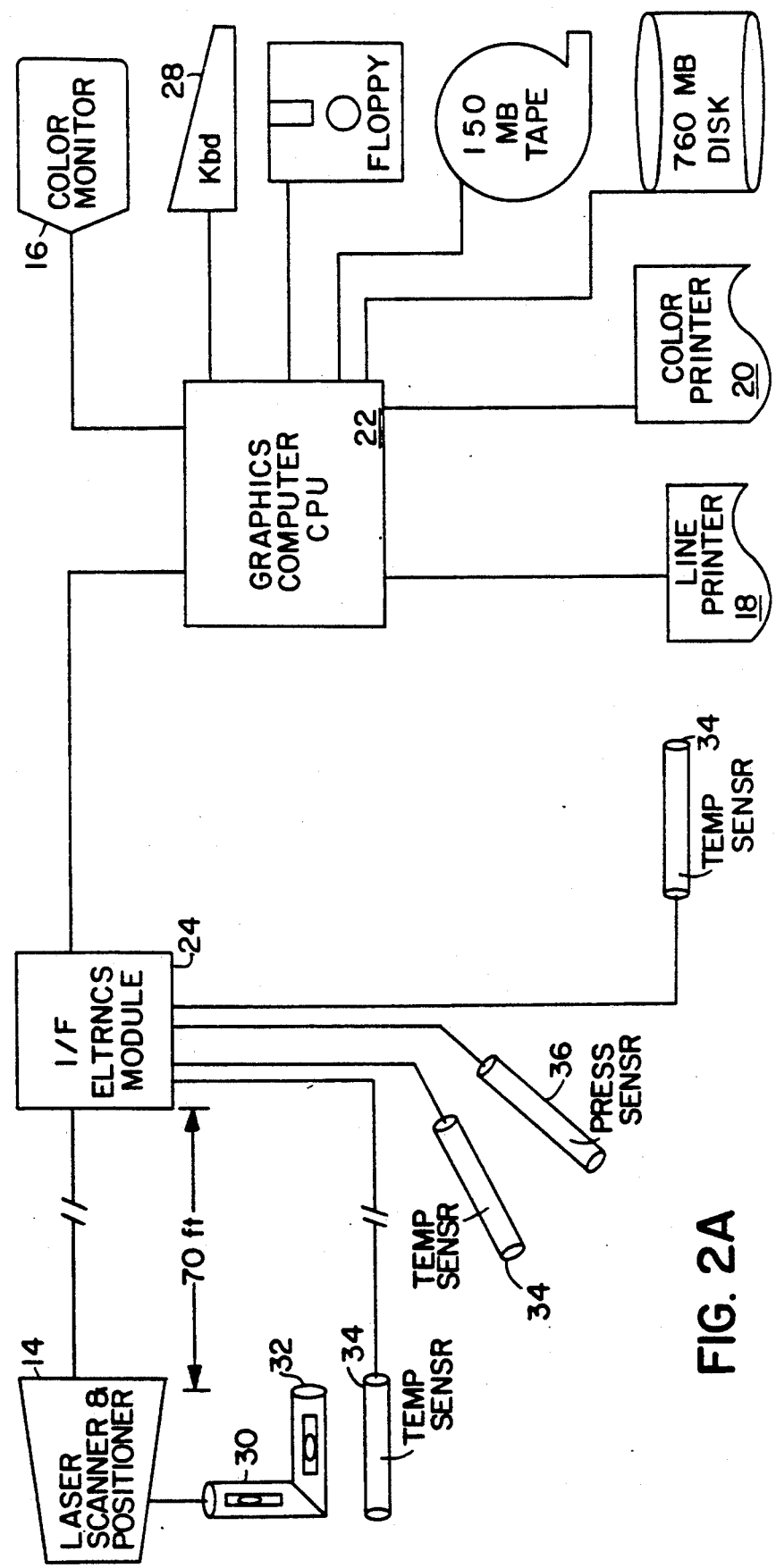
FIG. 2A is a block diagram of the present measurement system.

Referring now to FIG. 2A which shows a hardware functional diagram of the present measurement system 10, the central processing unit 22 receives inputs and provides outputs to the other components of the measurement system. The video monitor 16, printer 18, and color printer 20 are the primary output mechanisms for the system. It will be appreciated, however, that other output devices may be provided including electronic connection to other systems such as those used for applying gunning material to the furnace lining. Although many computers are suitable, a prototype system has been fabricated that includes a Personal IRIS model CPU that is commercially available from Silicon Graphics, Inc., Mountain View, Calif. The CPU 22 advantageously accesses memory media including floppy disks, tape drives, and hard disk drives, as illustrated. As described in more detail below, the computer 22 also outputs commands to the laser scanner and positioner system. Interface electronics 24 conveys and formats signals from the measurement system components to the computer 22 and commands from computer 22 to the system components using conventional circuitry, such as VME-standard printed circuit cards, and data transmission formats, such as RS-232, RS-170 and RS-422.

As mentioned above, FIG. 2A shows the scanner and positioner module 14 may be located as much as 70 feet from the CPU 22. The laser scanner and positioner module 14 has associated with it a pair of tilt sensors 30, 32 which are orthogonally disposed and provide signals for determining the scanner 14's tilt to an accuracy of at least 20-30 arcseconds as described below in connection with FIGS. 9A-9C.

Figure 2B:
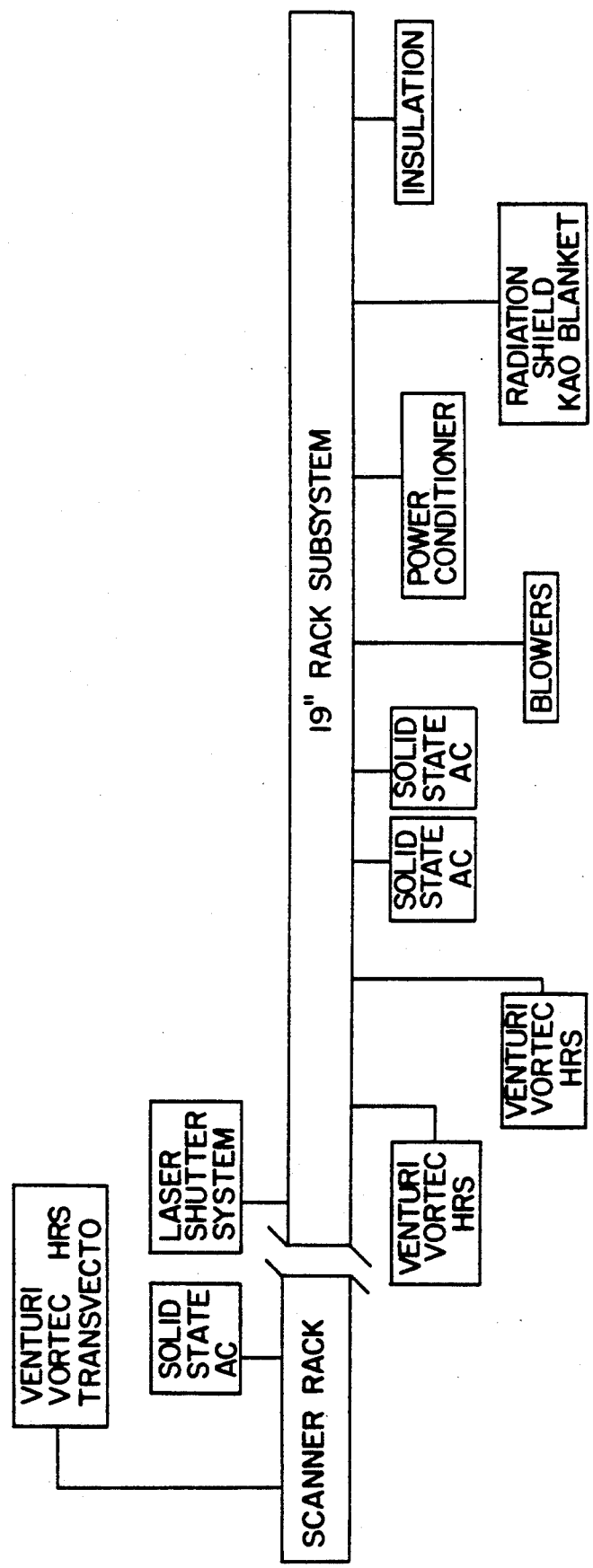
FIG. 2B is a block diagram of the rack subsystem of the present measurement system.

As seen in FIG. 2B, the support equipment of the measurement system 10 is provided in a standard 19-inch rack subsystem that includes power conditioning electronics and redundant cooling systems suitable for maintaining the operating environment of the electronic equipment in the face of the radiant heat from the vessel being measured. A combination of closed-loop cooling with heat exchanging air blowers and solid state electric air conditioners, which are otherwise conventional and commercially available from manufacturers such as EXAIR Corp., Cincinnatti, Ohio, and ThermoElectric Cooling America Corp., Chicago, Ill., and radiation shielding, which may be provided by Kao Board kaolin and Siltemp TM cloth insulating materials available from Thermal Ceramics Corp., have been found sufficient to protect the electronics of the measurement system. In addition, temperature and cooling fluid pressure sensors 34, 36 monitor the environmental conditions in the scanner module, equipment rack and ambient area. Redundant cooling systems, which are highly advantageous for the hot environment near a steel-making furnace, are described in, e.g., J. Miya, "Aesthetics Meets Functionality", Electronic Engineering Times, pp. 60-61 (Apr. 1, 1991).

The first line of defense in the present system's cooling system is the insulating boards and blankets that form the outer wall of a double-wall rack system. Factory-supplied air is circulated between the outer walls and the inner, generally aluminum walls, of the rack, (with its temperature controlled by heat exchangers) and because such air supply is often poor quality, the factory air is isolated from the interior of the rack and electronics modules. The temperature in the rack and modules is maintained by the solidstate air conditioners.

Because of the intense heat radiated from a refractory vessel, the laser shutter system is advantageously provided to block the vessel's radiant heat from the laser scanner system when the scanner is not in use. The laser shutter system preferably includes a movable shutter plate and Airknife TM air curtain system commercially available from EXAIR Corp. that acts like a "transparent shutter" when the shutter plate is open.

As described in more detail below, the vessel surfaces are modeled as a set of points that are grouped into neighborhoods, called tiles, and laser image data from the laser scanner and shutter module 14 consisting of thousands of range and reflectance values obtained from a given position of the imager 14 are mapped to the vessel tiles via a 2½-D modelling process. Modelling processes for object recognition and location are well known in image processing. Various aspects of 2-D, 2½-D and 3-D object recognition techniques are described in, e.g., R. Chin et al., "Model-Based Recognition in Robot Vision", ACM Computing Surveys, vol. 18, pp. 67-108 (March, 1986). 2½-D representations use features defined in a viewer-centered "surface space" for object recognition and depend on local surface properties of the object in each view, e.g., range, reflectance and surface orientation, instead of simple object boundaries that are employed in 2-D modelling. For example, reflectance values can be used to enhance a range-value image for improved "seeing" of predetermined points and/or to assist in visualizing the range data by smoothing transitions between surface patches.

Such local surface properties are lost in 2-D image processing, making many industrial vision tasks beyond the competence of conventional machine-vision systems, and well beyond the capability of the other furnace measurement systems described above. Matching features from an input image with those of a model object using 2½-D models involves comparing sets of planar or curved surface patches and interpolating to smooth transitions between the patches. Such procedures can be either direct, by finding best-fitting regions between the image and the model, or indirect, by comparing features derived from the surfaces. The computation and use of range maps for object recognition by use of active, light time-of-flight measurements are described in, e.g., R. Jarvis, "A Laser Time-of-Flight Range Scanner for Robotic Vision", IEEE Trans. Pattern Anal. Mach. Intell., vol. 5, pp. 505-512 (September, 1983); and T. Kanade et al., "Noncontact Visual Three-Dimensional Ranging Devices", Proc. SPIE Conf. on 3-D Machine Perception, vol. 283, pp. 48-53 (April, 1981). A relational surface patch model in which nodes represent planar or smoothly curved surfaces extracted from a range map is described in M. Oshima et al., "Object Recognition Using Three-Dimensional Information", IEEE Trans. Pattern Anal. Mach. Intell., vol. 5, p 353-361 (July, 1983). In the Oshima et al. system, the range map is used as the basis for segmenting an image into regions.

In the present system, the basis for 2½-D image processing is a model of the furnace or other vessel to be measured that is entered from the furnace's engineering drawings and other available information. The process for entering the furnace model is described below in connection with FIGS. 11A-11C.

Figure 3:
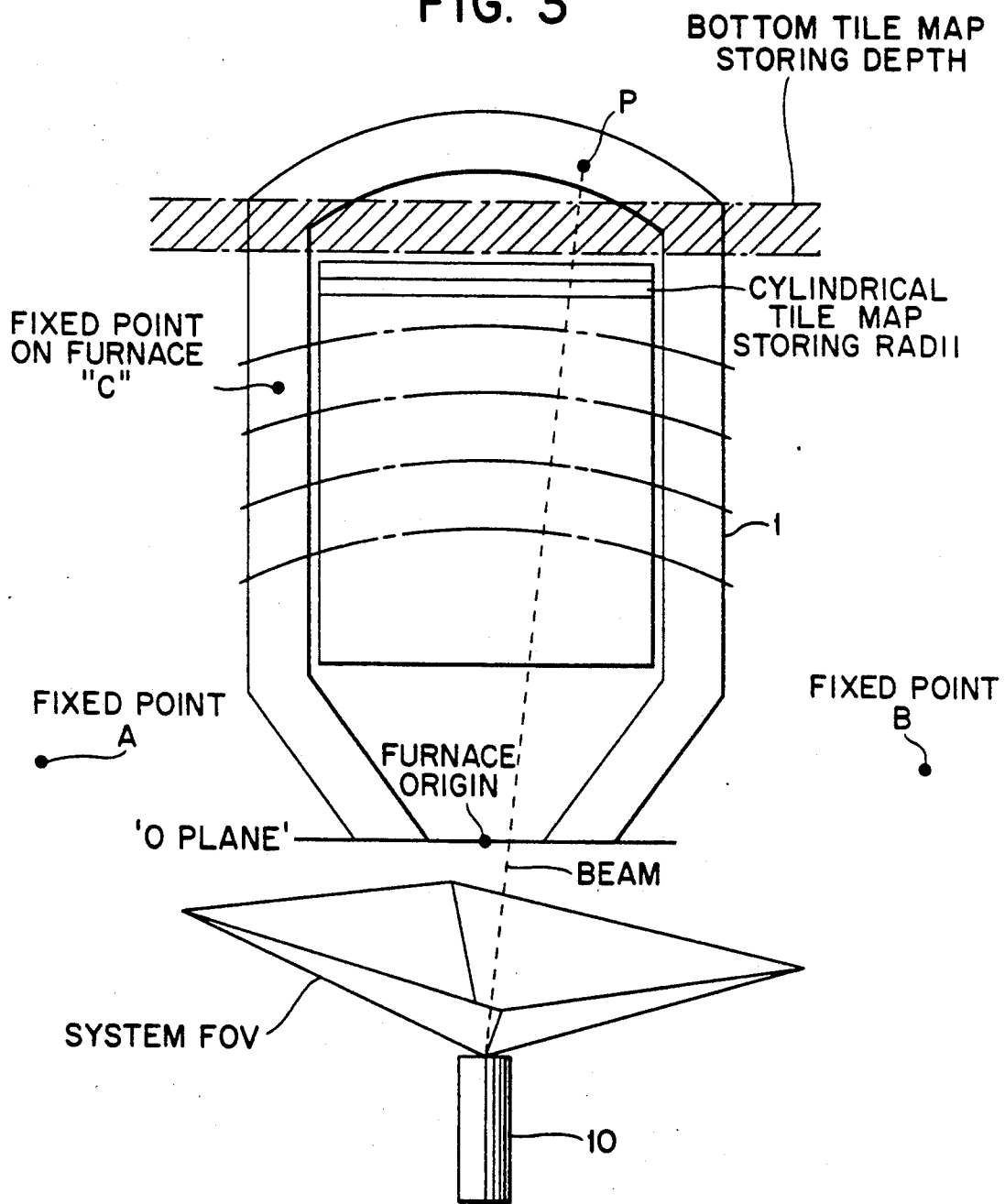
FIG. 3 shows the arrangement of the present measurement system before a furnace to be measured.

As a first step to establish the mapping of image data points to the tiles, a furnace reference coordinate system is established. The general arrangement is illustrated in FIG. 3. The measurement system 10 is rolled into a convenient position before a furnace 1, or other vessel or surface to be characterized; two fixed points, A and B, are then imaged by the system. The points A and B are fixed with respect to the furnace 1, and may conveniently be provided by 8-inch diameter reflectors that are permanently attached to building or vessel support structures.

The system 10 then establishes the furnace reference coordinate system based on the measured points A and B. As described in more detail below, when the imager is positioned for a subsequent vessel measurement, which unavoidably will be made from a different point with respect to fixed points A and B, the measurement system's new position and yaw value are calculated with respect to the reference coordinate system. Thus, in contrast to prior measurement systems that demand siting the line from A to B as parallel to the furnace tilt axis as possible, the present system uses A and B merely to locate the imager 14. Any yaw between the imager and the initial and subsequent measurements of the A-B line is removed in transforming subsequent images to the reference coordinate system.

Figure 4A:
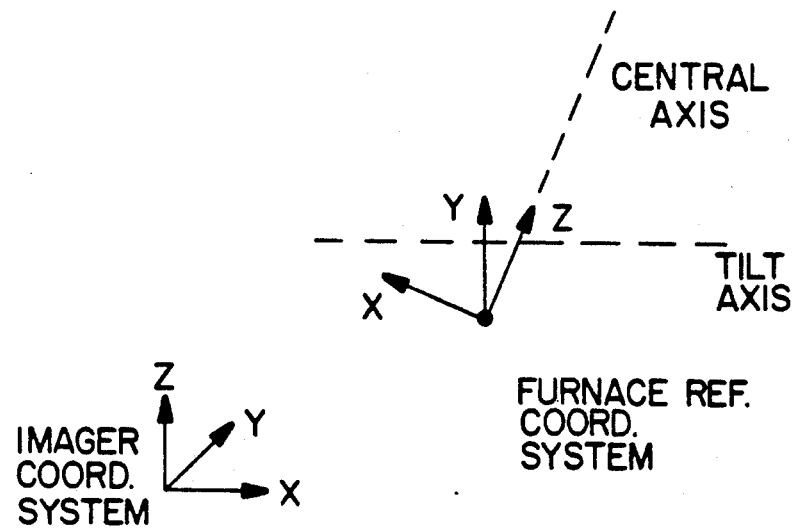
FIGS. 4A and 4B illustrate the imager and furnace reference coordinate systems.
Figure 4B:
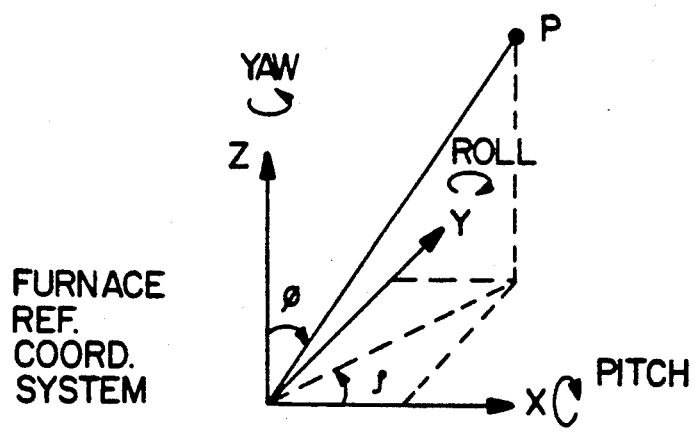

In the present system, the data points collected by the imager are located in an imager coordinate system illustrated in FIG. 4A by the imager beam's known azimuth and elevation angles. The present measurement system locates the furnace coordinate system's origin at the center of the furnace mouth and directs its Z-axis along the central axis of the furnace. In addition, the Y-axis is aligned with the furnace's predefined "12 o'clock" position, and the "handedness" of the imager and furnace coordinate systems are the same for ease of computation. As shown in FIG. 4B, the location of a point P on the lining of the furnace can be determined from azimuth and elevation angles $\Theta$ and $\phi$, respectively, which are related by simple angular displacement functions to the azimuth and elevation angles a and e in the imager coordinate system.

Figure 5A:
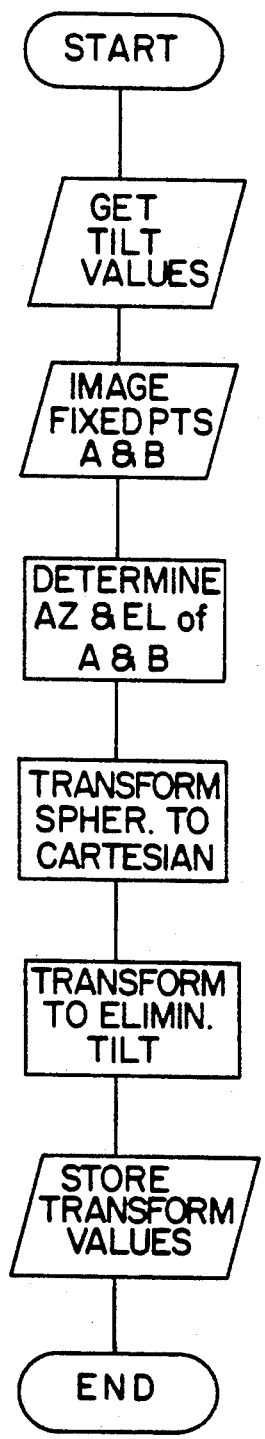
FIGS. 5A and 5B are flowcharts for locating fixed points and the present measurement system in a reference coordinate system.

Referring to FIG. 5A, the first step in the process involves retrieving imager pitch and roll values from tilt sensors 30 and 32. Next, fixed points A and B are imaged, and their azimuths and elevations in the FOV of the imager 14 are determined. (It will be understood that locating points A and B in the FOV is simply a matter of correlating the received signals from the reflectors with the angular positions of the scanning mirrors in imager 14.) The locations of points A and B in imager spherical coordinates are then transformed to cartesian coordinates by well known geometrical relationships, such as those set forth in U.S. Pat. No. 4,025,192 to Scholdstrom et al.; in the process of this transformation, the tilt of the imager is set to zero as described below. The transformed location values for points A and B are then stored.

Figure 5B:
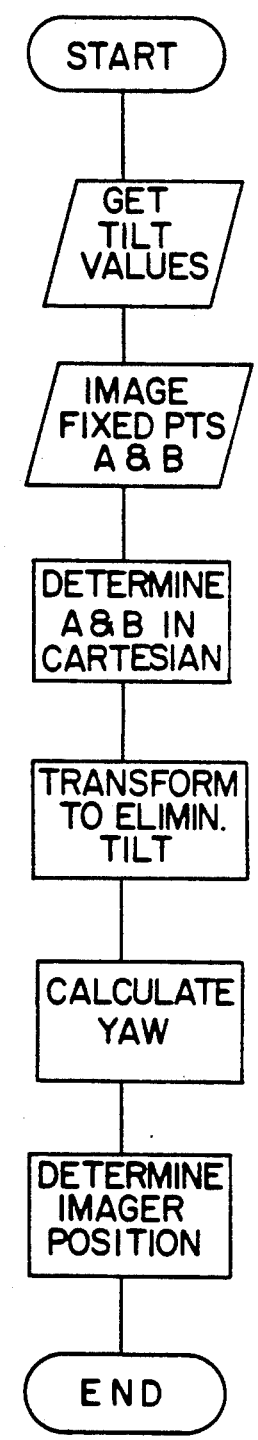

After the imager or the furnace has been moved, the measurement system position is determined with respect to the reference coordinate system as illustrated in FIG. 5B. Pitch and roll values from tilt sensors 30 and 32 are input to computer 22, and fixed points A and B are imaged. The locations of points A and B in spherical coordinates are determined and transformed to cartesian coordinates as before. The yaw value of the new measurement system position can be calculated from well known geometry, and the imager position itself can then be determined.

As described below, further steps carried out in the thickness measurement process are to determine the locations of the vessel tilt axis, central axis and an origin point on the vessel with respect to, and to establish, the reference coordinate system. The mapping of laser image data to vessel tiles can then be completed with roll and pitch angles provided by the tilt sensors and furnace tilt provided by at least one fixed point that is on the furnace.

To establish the furnace tilt axis (i.e., the trunnion axis) with respect to the furnace reference coordinate system, the following steps are implemented during system initialization. It will be appreciated that the furnace's tilt axis is generally not perpendicular to the furnace's central axis; indeed, the two axes may not even intersect. Accordingly, it is necessary to establish the tilt axis for proper subsequent image data manipulation.

1. One or more fixed reflective targets are placed onto the furnace, e.g., at the point C shown in FIG. 3, such that the target is visible to the imager through the largest possible range of furnace tilting and that the radius (distance) from the target to the furnace tilt axis (i.e., the point on the tilt axis such that a line from the target to the point is perpendicular to the tilt axis) is maximized. (These constraints minimize errors in establishing the furnace tilt axis in the furnace reference coordinate system.)

2. The imager is positioned so that the target is visible (i.e., in the imager's FOV), and the imager's location in the reference coordinate system (i.e., $P = (P_x, P_y, P_z)$ and $YAW = \Theta$) is found according to the steps described in FIG. 5B.

3. The target is then imaged at the extremes and midpoint of the furnace tilt range through the following steps:

(a) The target location (az, el, and range) with respect to the imager's current position and yaw is determined for each furnace tilt value;

(b) The target location in spherical coordinates is transformed to cartesian coordinates as in FIGS. 5A and 5B, yielding the target location (x, y, z) with respect to the imager with no imager tilt, by applying the following rotations about the X and Y axes by P and R radians, respectively, that are determined from the pitch and roll tilt sensors 30, 32:

$$Rot_x R = \begin{bmatrix} 1 & 0 & 0 \\ 0 & C_R & S_R \\ 0 & -S_R & C_R \end{bmatrix}$$

$$Rot_y P = \begin{bmatrix} C_P & 0 & -S_P \\ 0 & 1 & 0 \\ S_P & 0 & C_P \end{bmatrix}$$

(c) The yaw angle $\Theta$ between the imager's current location and the imager's calibration location (or any subsequent location for that matter) is determined by imaging the two fixed points from the current location, yielding results $A_{CUR}$ and $B_{CUR}$, and comparing the current results to the prior results $A_{CAL}$ and $B_{CAL}$. Letting:

$$(A_{CAL} - B_{CAL}) = x_o i + y_o j + z_o k$$

and $$(A_{CUR} - B_{CUR}) = x_n i + y_n j + z_n k$$

the yaw angle $\Theta$ is given by:

$$\Theta = \sin^{-1}\left[\frac{y_n x_o - x_n y_o}{x_n^2 + y_n^2}\right]$$

(d) The imager position and yaw is removed, yielding the target location (a, b, c) in the reference coordinate system, as follows: to remove imager yaw:

$$\begin{bmatrix} x' \\ y' \\ z' \end{bmatrix} = \begin{bmatrix} \cos(-\Theta) & \sin(-\Theta) & 0 \\ \sin(-\Theta) & \cos(-\Theta) & 0 \\ 0 & 0 & 1 \end{bmatrix} \begin{bmatrix} x \\ y \\ z \end{bmatrix}$$

to remove imager position:

$$\begin{bmatrix} a \\ b \\ c \end{bmatrix} = \begin{bmatrix} x' \\ y' \\ z' \end{bmatrix} + \begin{bmatrix} P_x \\ P_y \\ P_z \end{bmatrix}$$

$\Theta$ and $P_x$, $P_y$ and $P_z$ are found according to the steps show in FIG. 5B.

(e) The result for each tilt value is (a, b, c) defining the target position in space with respect to the furnace reference coordinate system. To improve accuracy, more three-furnace-tilt-value target sets could be located and a statistical measure developed.

Figure 6:
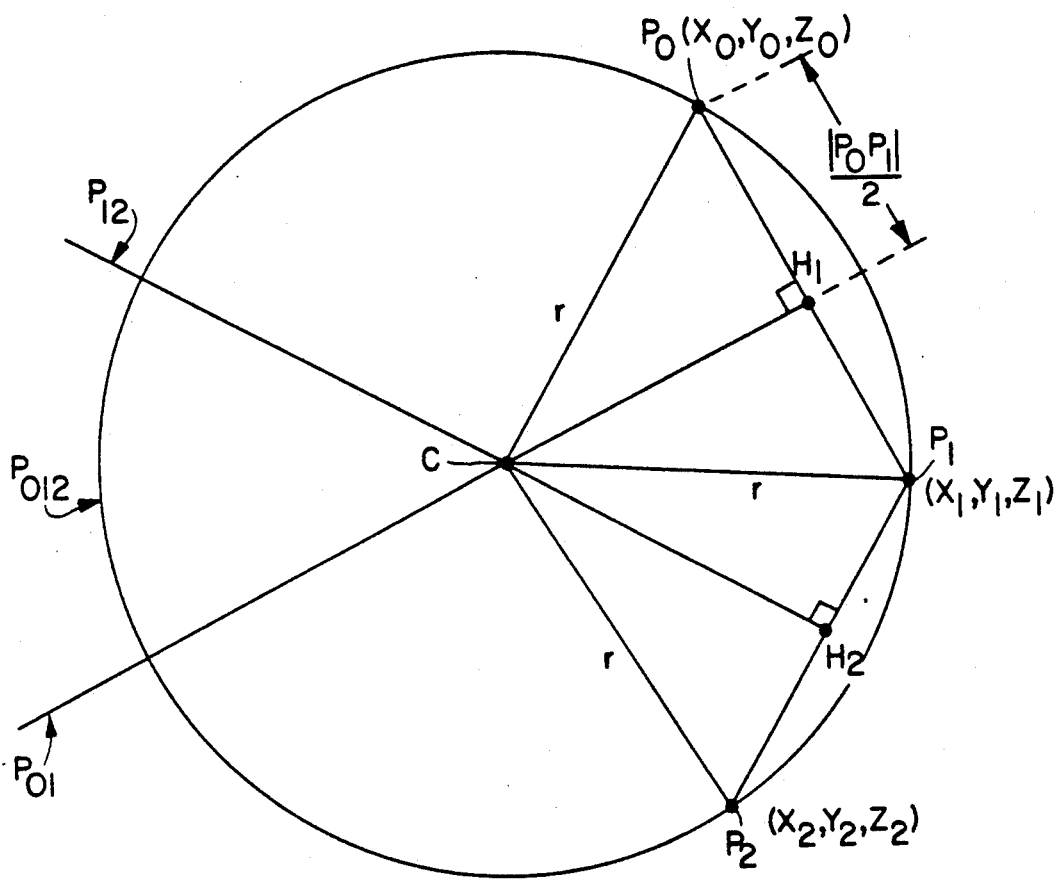
FIG. 6 shows geometry for locating the furnace tilt axis with respect to the reference coordinate system.

4. Now let the three target positions for the three furnace tilt values be given by:

$$P_0 = (x_0, y_0, z_0)$$

$$P_1 = (x_1, y_1, z_1)$$

$$P_2 = (x_2, y_2, z_2)$$

where $P_0$, $P_1$ and $P_2$ are not co-linear, as shown in FIG. 6. Then the plane $P_{012}$ containing $P_0$, $P_1$ and $P_2$ is given by:

$$ax + by + cz + K_1 = 0$$

where:

$$a = (y_1 - y_0)(z_2 - z_0) - (y_2 - y_0)(z_1 - Z_0)$$

$$b = (z_1 - z_0)(x_2 - x_0) - (z_2 - z_0)(x_2 - x_0)$$

$$c = (x_1 - x_0)(y_2 - y_0) - (x_2 - x_0)(y_1 - y_0)$$

$$K_1 = -(ax_0 + by_0 + cz_0)$$

Moreover, the plane $P_{01}$ of points that are equidistant from $P_0$ and $P_1$ is given by:

$$dx + ey + fz + K_2 = 0$$

where:

$$d = 2(x_1 x_0)$$

$$e = 2(y_1 y_0)$$

$$f = 2(z_1 z_0)$$

$$K_2 = (x_0^2 + y_0^2 + z_0^2) - (x_1^2 + y_1^2 + z_1^2)$$

Furthermore, the plane $P_{12}$ of points that are equidistant from $P_1$ and $P_2$ is given by:

$$gx + hy + iz + K_3 = 0$$

where:

$$g = 2(x_2 - x_1)$$

$$h = 2(y_2 - y_1)$$

$$i = 2(z_2 - z_1)$$

$$K_3 = (x_1^2 + y_1^2 + z_1^2) - (x_2^2 + y_2^2 + z_2^2)$$

5. The point C of intersection of the planes $P_{012}$, $P_{01}$ and $P_{12}$, which is a point on the furnace tilt axis, is then determined as follows:

$$[A][C] = [K]$$

where [A], [C] and [K] are the following matrices:

$$[A] = \begin{bmatrix} a & b & c \\ d & e & f \\ g & h & i \end{bmatrix}$$

$$[C] = \begin{bmatrix} C_x \\ C_y \\ C_z \end{bmatrix}$$

$$[K] = \begin{bmatrix} -K_1 \\ -K_2 \\ -K_3 \end{bmatrix}$$

and thus:

$$[C] = [A]^{-1}[K]$$

where $[A]^{-1}$ is just $[A]_{adjoint}/|A|$.

It will be noted that $P_{012}$ is perpendicular to both $P_{01}$ and $P_{12}$, and the planes intersect at only a point on the tilt axis because the line of intersection of $P_{01}$ and $P_{12}$ is not parallel to $P_{012}$.

6. The direction cosines of the furnace tilt axis are derived from $P_0$, $P_1$ and $P_2$ according to:

$$L = (y_1 - y_0)(z_2 - z_0) - (y_2 - y_0)(z_1 - z_0)$$

$$M = (z_1 - z_0)(x_2 - x_0) - (z_2 - z_0)(x_1 - x_0)$$

$$N = (x_1 - x_0)(y_2 - y_0) - (x_2 - x_0)(y_1 - y_0)$$

and the direction cosines are then:

$$l = L(L^2 + M^2 + N^2)^{-\frac{1}{2}}$$

$$m = M(L^2 + M^2 + N^2)^{-\frac{1}{2}}$$

$$n = N(L^2 + M^2 + N^2)^{-\frac{1}{2}}$$

7. The intersection point C and the direction cosines l, m and n that define the furnace tilt axis are then stored, provided $n \neq \pm 1$. The latter proviso, which states in essence that the furnace tilt axis cannot be perpendicular to the X-Y plane of the reference coordinate system (i.e., perpendicular to the gravity plane), permits furnace tilt calculations relative to the absolute gravity plane rather than an arbitrary furnace support structure plane.

To establish the furnace central axis and furnace origin or re-establish the furnace position with respect to the reference coordinate system, the following steps are implemented.

1. At least three reflective targets are placed on the furnace or an imager-locatable contour of three points on the furnace is used. These three points must fall substantially on a circle centered on the furnace's central axis, and the plane defined by these points must be substantially perpendicular to the furnace's central axis. To minimize errors, the circle should have the largest practical radius and the points should be as far apart on the circle as practical. As noted above, by using several sets of three points, accuracy can be enhanced by statistical analysis of the derived sets of direction cosines and points on the central axis.

2. A point on the central axis and the axis direction cosines are determined by use of the processing steps 2 through 7 described above in establishing the furnace tilt axis; then the located point and the direction cosines are stored.

3. The operator determines and enters whether or not the central axis point is above or below the furnace tilt axis when the furnace mouth is positioned looking upward. This indication is stored.

4. The operator enters the distance along the central axis from the central axis point to the desired furnace "O plane" or origin point. Ordinarily, the desired O-plane and origin point are defined for each furnace from that furnace's engineering drawings. Thus, after simple manipulations, the desired furnace origin position can be located in the furnace reference coordinate system.

After initialization and furnace or imager motion, the following steps are carried out to determine the furnace tilt in the reference coordinate system. It will be understood that 0° or 180° furnace tilt is preferably defined to be that furnace tilt where the furnace central axis is parallel to the "gravity plane", i.e., the plane defined by the X and Y axes of the reference coordinate system, and 0° can be arbitrarily defined as that tilt where the furnace origin is closer to the imager. Any arbitrary tilt can then be determined by comparing a vector associated with 0° to a vector associated with the arbitrary tilt.

Figure 7:
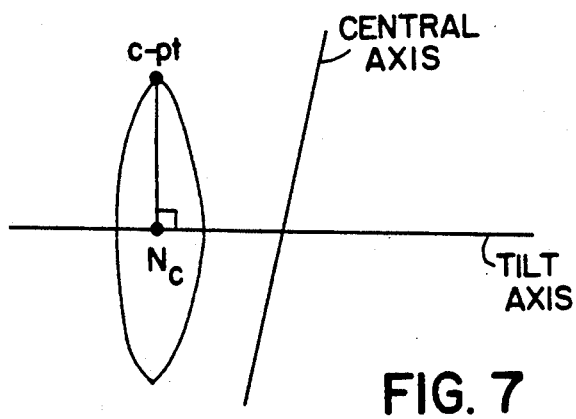
FIG. 7 shows geometry for determining furnace tilt.

Referring to FIG. 7, this process is equivalent to, for each reflective target, or C-point, defined on the furnace, finding the point $N_c$ on the tilt axis such that the vector $CN_c$ is perpendicular to the tilt axis. Comparing $CN_c$ to a vector $ON_o$ defined by the following two points determines the furnace tilt associated with the current position of C. $ON_o$ is the vector from the furnace origin O, where O's position is defined above as $O^o$, to $N_o$, which is the point on the tilt axis such that $ON_o$ is perpendicular to the tilt axis.

Figure 8:
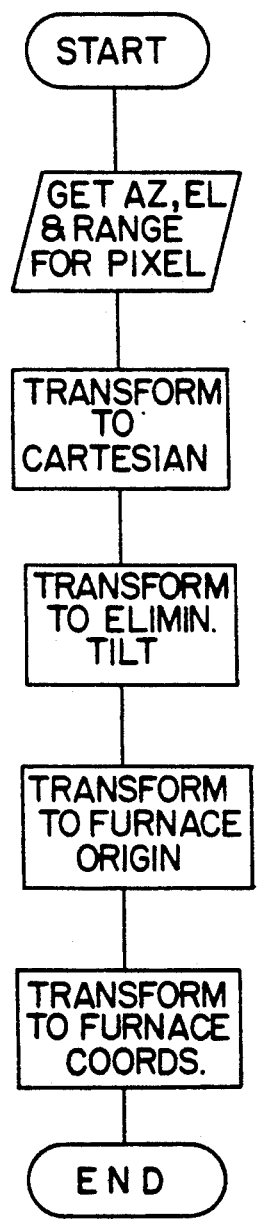
FIG. 8 is a flowchart for mapping image points to the furnace coordinate system.

With the imager's position and yaw known and the furnace tilt known in the reference coordinate system, then mapping an image pixel to furnace coordinates follows the steps illustrated in FIG. 8. In general, the mapping process involves operations similar to those described above. In addition, the step of transforming to the furnace origin involves making congruent the furnace-coordinates origin of the measured data and the predefined furnace origin.

The step of transforming the received imager data to furnace coordinates comprises using the measured furnace tilt value and predetermined furnace "12 o'clock" position to transform, as needed, the data by rotations to the furnace coordinate system, binning the transformed data into the tiles of a predefined furnace surface map and comparing the measured furnace surface map to a predetermined model of the furnace. Thus, rather than merely display the imager data to the operator, the present system re-creates or re-represents the imager data in a tile format.

As described in more detail below, it is believed that for furnace measurement applications, square tiles having a fixed depth (the particular dimensions of the tiles preferably determined by the worst-case resolutions of the imager) are preferred among the wide variety of tilings often used in 2½-D image processing. In this way, several imager range data points will usually be classified into each tile, and the accuracy of the thickness measurement can be improved by averaging the points in each tile.

Contemporary 2½-D imaging systems obtain a range R and take this value of distance as an absolute metric in generating their occupancy maps. In other words, an error, $\epsilon$, contained in R is also contained in the absolute metric. Hence, the true distance recorded by such systems is $R_t$, where:

$$R_t = |R + \epsilon|$$

Among the advantages provided by the present system, robust statistics are used to lessen the effects of outlier range values for $\Delta x$, $\Delta y$ and $\Delta z$ tolerance bands around the absolute range, R.

Figure 9A:
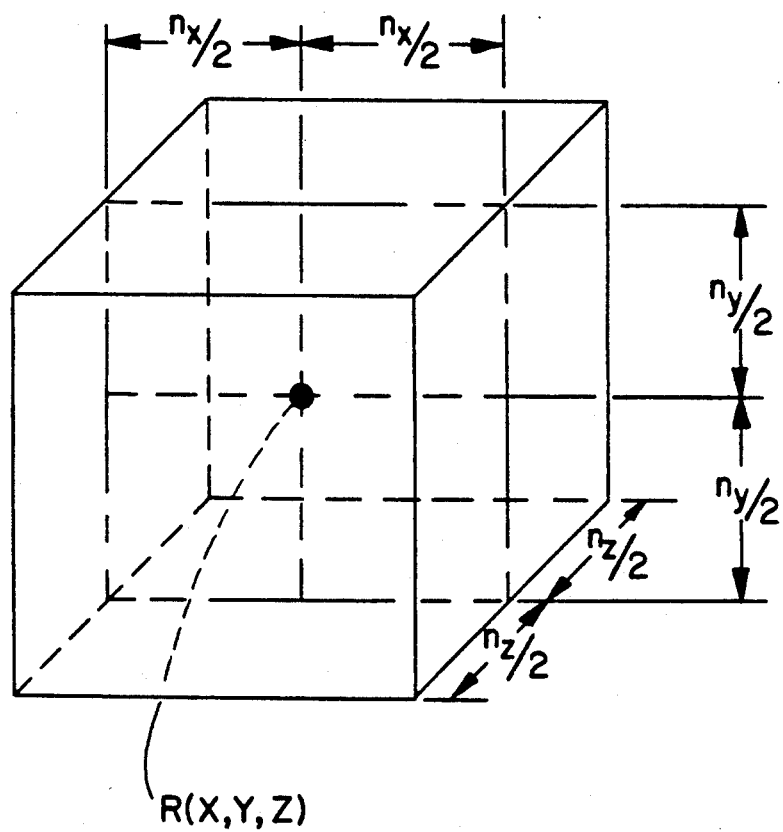
FIGS. 9A-9C show geometries and parametric relationships for determining tile dimensions.

Referring to FIG. 9A, a volume $(n_x \times n_y \times n_z)$ around range value $R(x,y,z)$ may contain a number, p, of measured range values that can be represented as a vector or set $\{R\} = \{R_1, R_2, R_3 \ldots R_p\}$. (It will be understood that the volume dimensions are not necessarily identical but can be individually selected.) Robust statistics are applied to the set R to estimate the true range value. An example of such a statistic is Median R, others are quartile and percentile statistics; it will be understood that many other appropriate statistics can be applied to suit sensor range data characteristics, for example to ameliorate the effects of varying range accuracy.

Figures 9B, 9C:
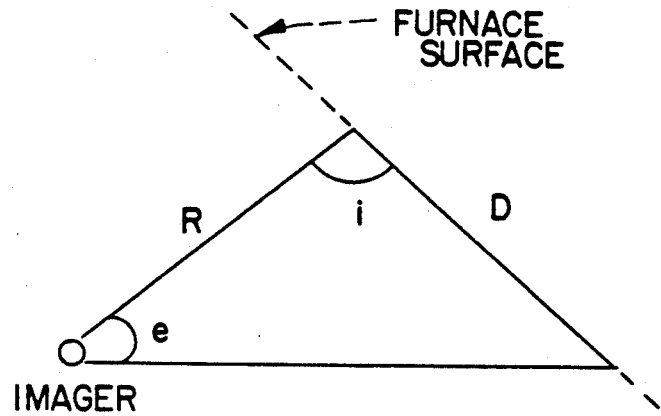

In the present system, the entire set of measured furnace range data values from the furnace surface is represented by a set of the smallest such volumes or tiles $(n_x, n_y, n_z)$ in a tile model. These furnace tiles are arranged to represent any furnace surface shape. Tile selection is accomplished based on the angular accuracy, e, of the imager and the worst case range and incidence angle values for the measurement environment. FIGS. 9 and 9C illustrate the relationship of these parameters.

As seen in FIG. 9B, the finite angular accuracy, e, of the imager leads to errors, D, along the furnace surface that depend on the range, R, from the imager to the furnace and the incidence angle, i, between the imager's transmitted light beam and the furnace surface. The relationship among these parameters is given by:

$$e = \tan^{-1}\{\cos(i-90)/[(R/D) + \sin(i-90)]\}$$

The table shown in FIG. 9C presents values of e in both degrees and seconds of arc for three values each of R and D and an incidence angle of 120°. It will be appreciated that the worst-case value of 25 arcseconds for R=60 feet and D=0.1 inch substantially determines the accuracy required of tilt sensors 30, 32.

Once the image data is mapped to the tiles and compared to the furnace model, a wide variety of graphics processing techniques can be applied to the data for visualization purposes as deemed suitable for the particular measurement environment. Such techniques are described in, e.g., W. Hibbard et al., "Visualizing Large Data Sets in the Earth Sciences", IEEE Computer, pp. 53-57 (August, 1989). In a prototype system, Gauraud shading of polygons, which is a technique for linearly interpolating colors, has been used in visualizing results.

Figure 10A:
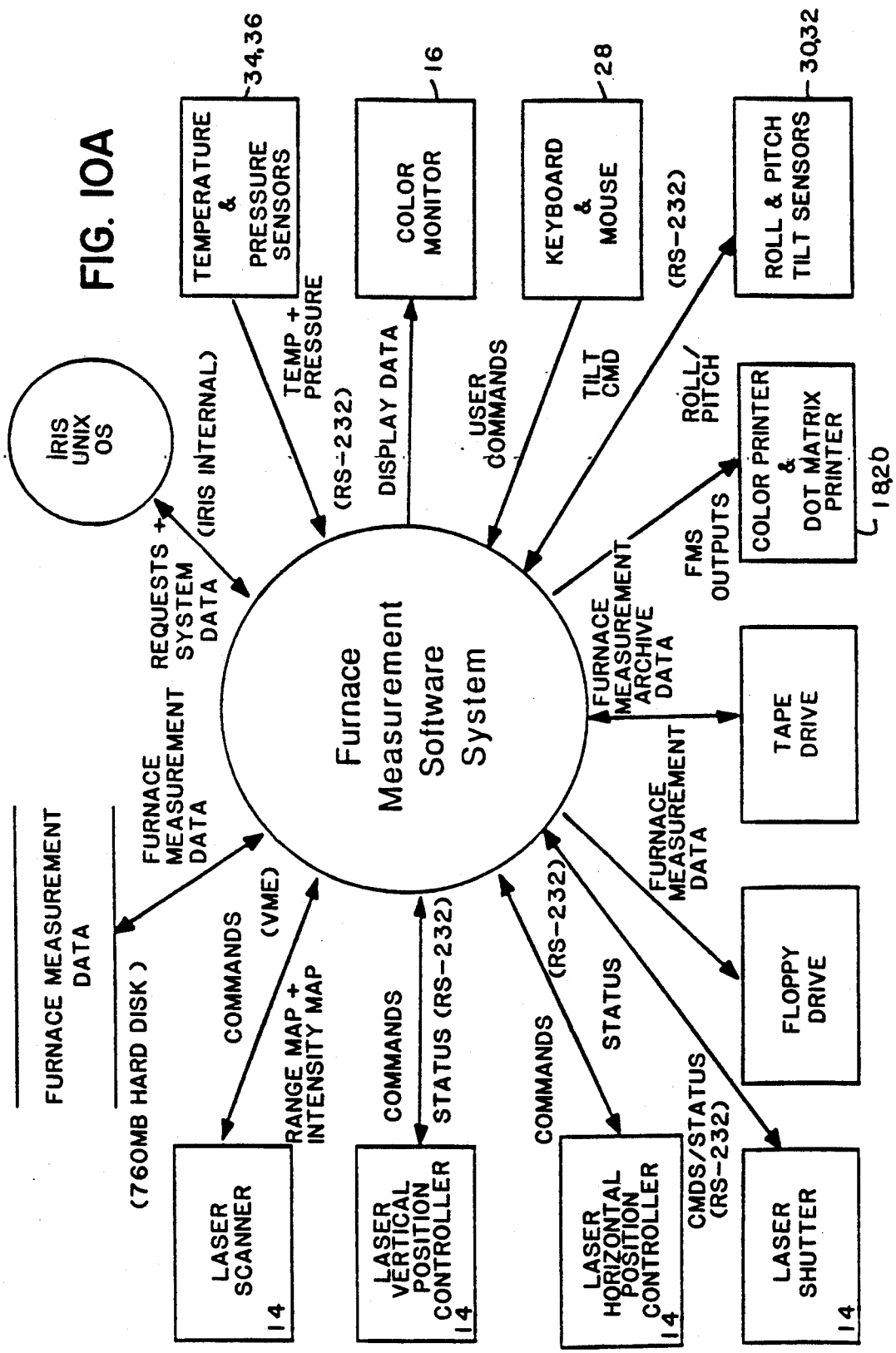
FIG. 10A is a software system context diagram.

Referring to FIG. 10A, the foregoing and other operations of the measurement system 10 are directed by suitable computer programs executed by CPU 22. The furnace measurement software system (FMS) receives the inputs and generates the outputs necessary for proper system operation. The software system generates commands for the laser scanner 14 and processes the received range and intensity map information. The software system also generates commands and receives status information for the laser scanner, laser shutter module, laser vertical FOV control, laser horizontal FOV control, and temperature and pressure sensors, and mediates data transfer to and from a measurement database memory, which can include floppy disk drives, tape drives and hard disks. As described above, outputs from the software system are also provided to a color image printer and a line printer as well as to a video monitor. Operator inputs to the software system in response to menu displays may come from a keyboard and a mouse, if desired, and other data inputs come from the imager tilt sensors 30, 32, and temperature and pressure sensors 34, 36. The furnace measurement software system also mediates interaction with the computer 22's internal operating system, which may advantageously be UNIX-based; the IRIX operating system used in the Silicon Graphics Personal IRIS computer is UNIX-based.

Figure 10B:
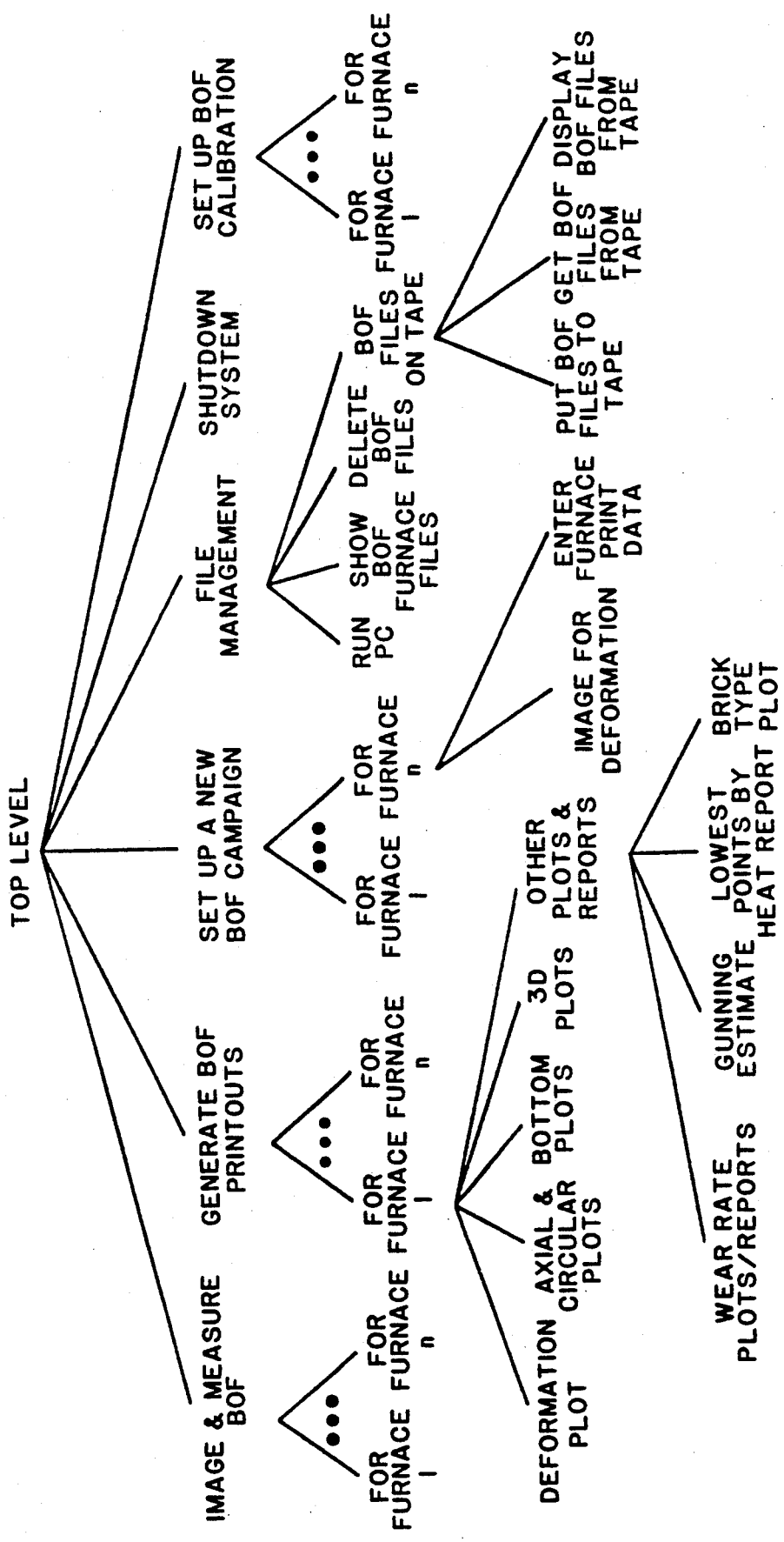
FIG. 10B shows a command hierarchy diagram for the present measurement system.

Referring to FIG. 10B, there is shown a command hierarchy for the furnace measurement software system. At the top level, six general tasks are carried out by the FMS. Although the figures are set in a context of measurements on a basic oxygen furnace (BOF), it will be understood by those of ordinary skill in this art that the system could be used for any vessel measurement or range measurement application.

Since a plurality of furnaces may be imaged using a single measurement system 10, an "Image and Measure BOF" procedure for a plurality of furnaces is provided that handles the presentation of appropriate menus to the operator, ingests and decodes the range and reflectance data from the imager 14 (i.e., handles interfacing and imager data format decoding as needed), and controls operator and system data entry and imager data processing. The "Image and Measure BOF" procedure also provides for developing and presenting appropriate error and help messages, performing and saving furnace and calibration measurements and calculations, displaying system status and results on the monitor 16, and saving results to the measurement database.

A "Generate BOF Printouts" command procedure for the plurality of furnaces is provided that also handles the presentation of appropriate menus to the operator, controls operator and system data entry, and develops and presents appropriate error and help messages. Under the "Generate BOF Printouts" procedure, it will be appreciated that a wide variety of measured data presentation formats can be provided. Such formats typically comprise deformation plots, axial and circular plots, bottom plots, three-dimensional plots and other plots and reports. With the exception of the three-dimensional plots, these plots are often generated in vessel lining measurement systems, such as those manufactured by Geotronics AB, IMS Division, Danderyd, Sweden.

The "Set-up a New BOF Campaign" command procedure handles the presentation menus such as those described below in connection with FIGS. 11A-11C, controls operator and system data entry, develops and presents appropriate error and help messages and set-up results, and saves results to the measurement database.

The "File Management" command procedure also develops and presents menus and messages for, and controls, the measurement database, which includes files for running the CPU 22 as well as files developed from prior furnace measurements that may be stored on floppy or hard disks or magnetic tape.

The "Set-up BOF Calibration" command procedure develops and presents menus and messages for, and controls and performs, the calibration calculations described above for determining the initial locations of the fixed points A, B and C's and the two furnace axes.

Figure 10C:
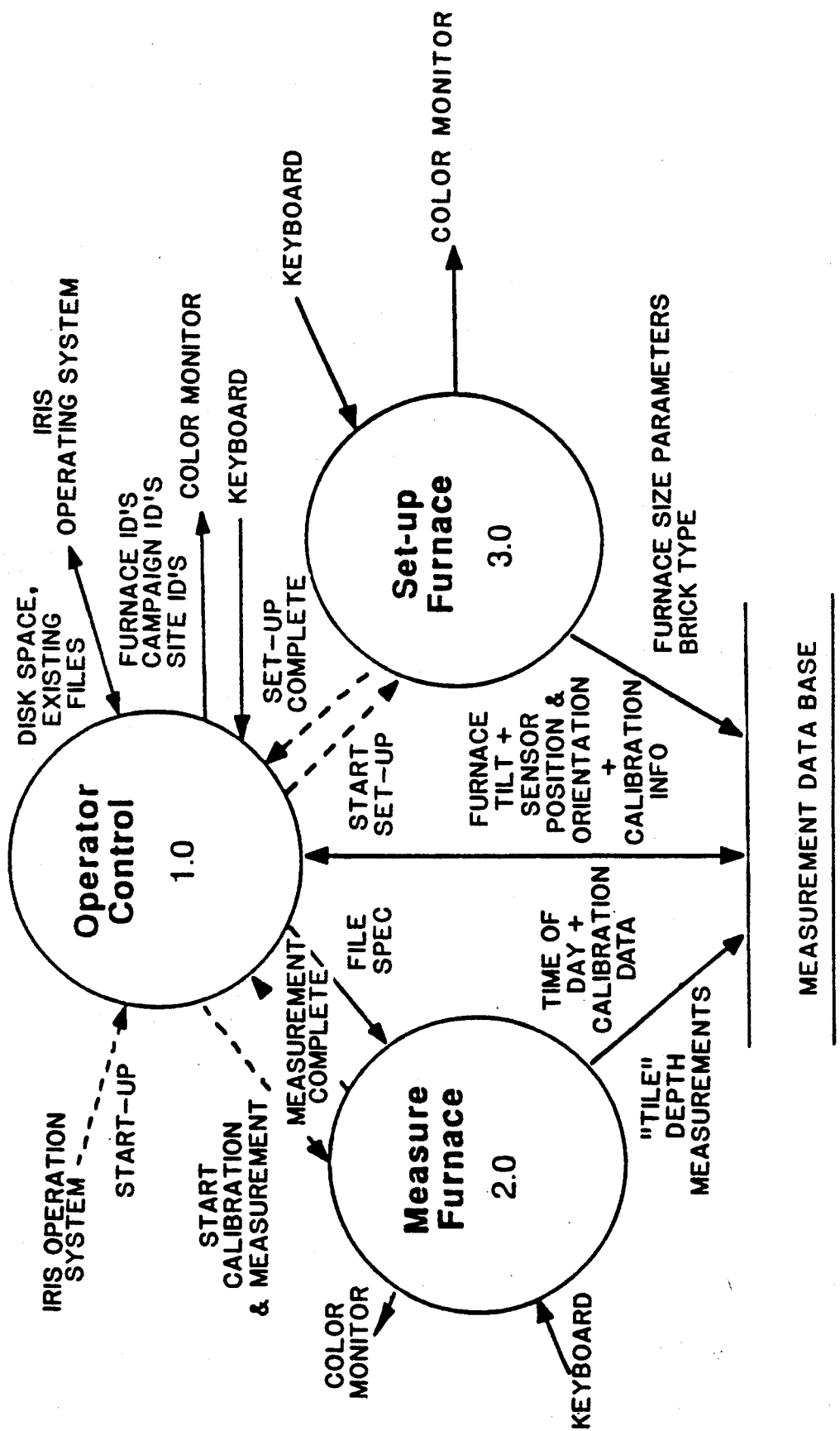
FIGS. 10C-10F show data flow diagrams for the present measurement system.
Figure 10D:
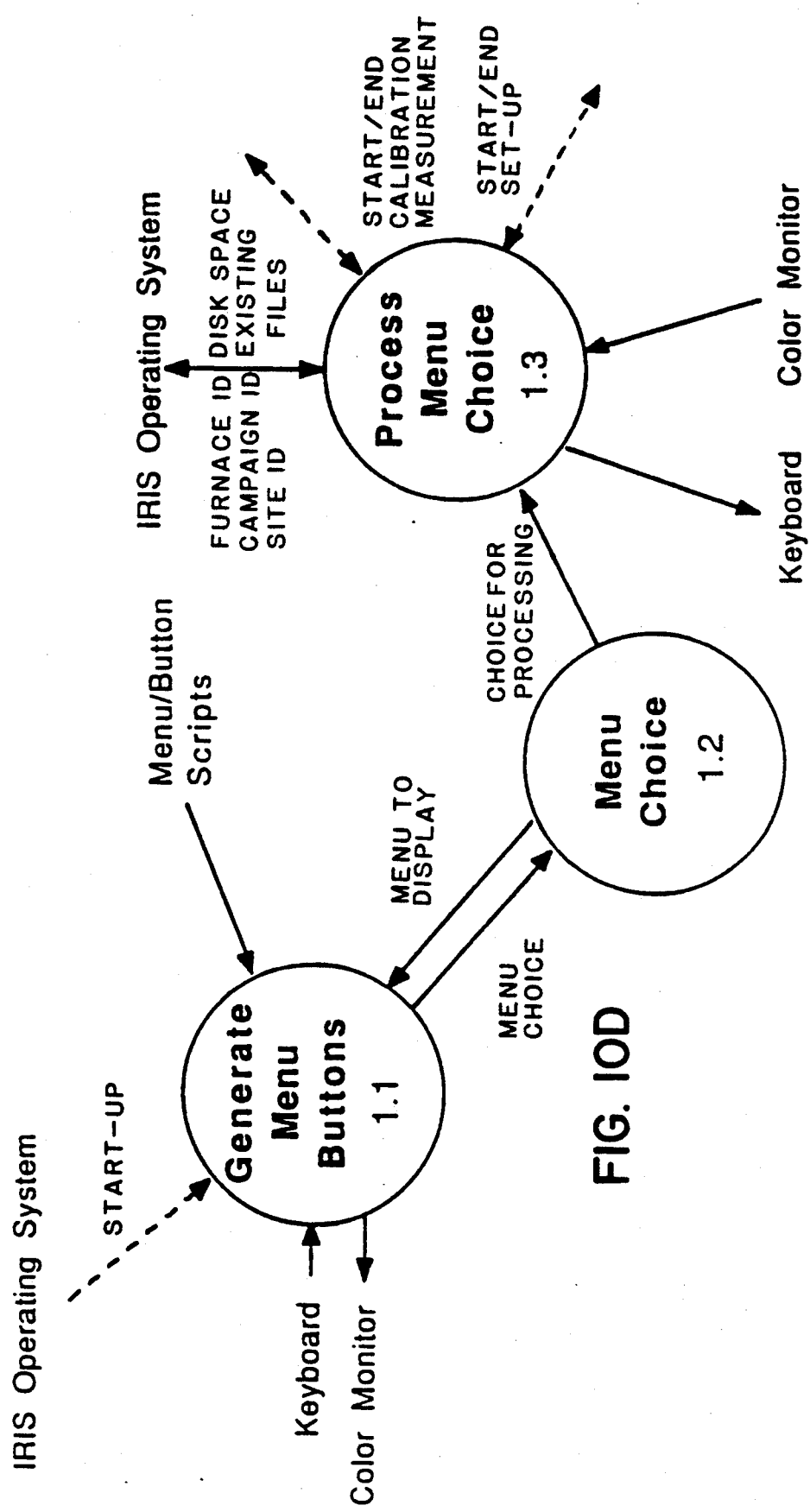
Figure 10E:
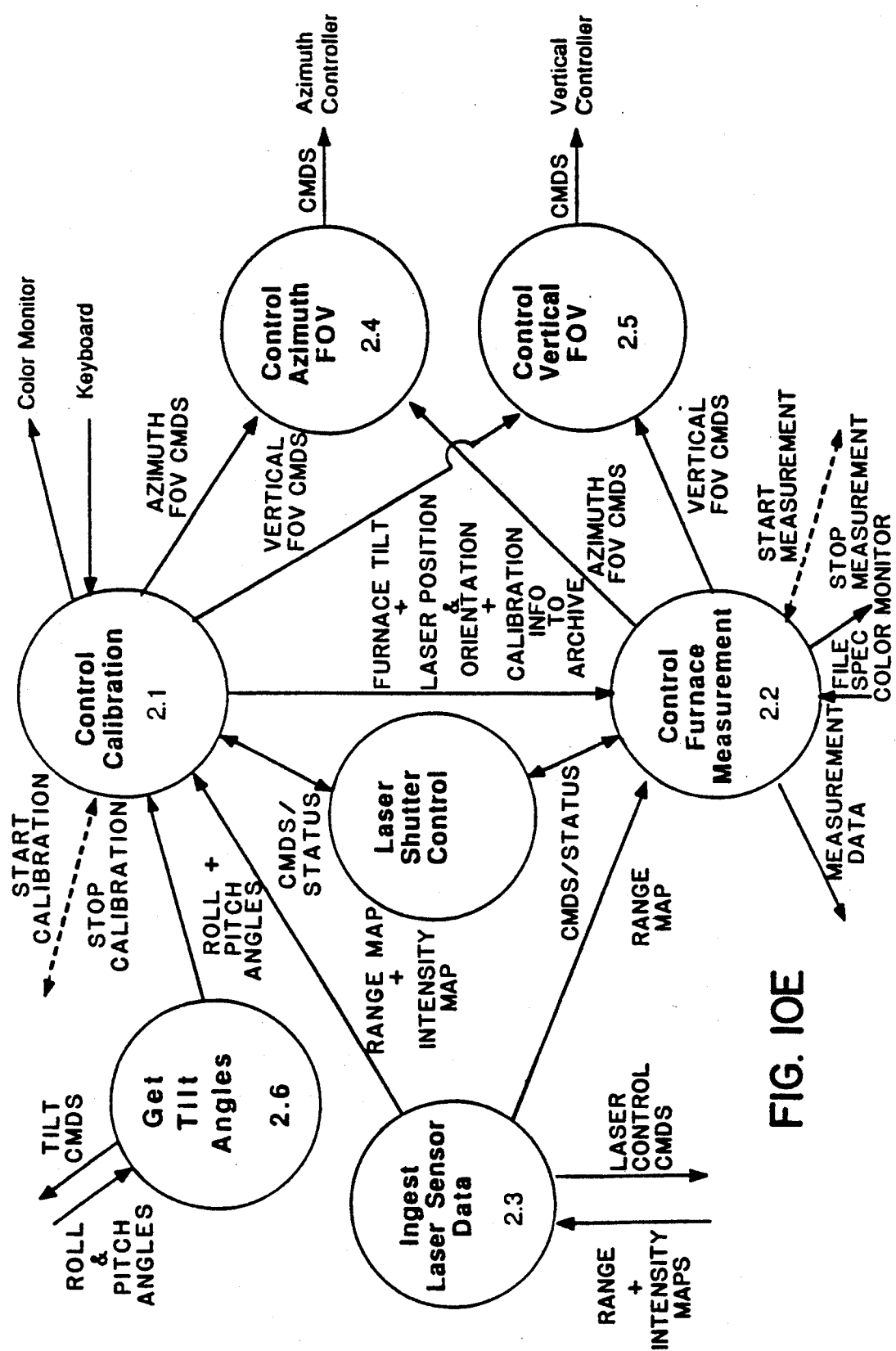
Figure 10F:
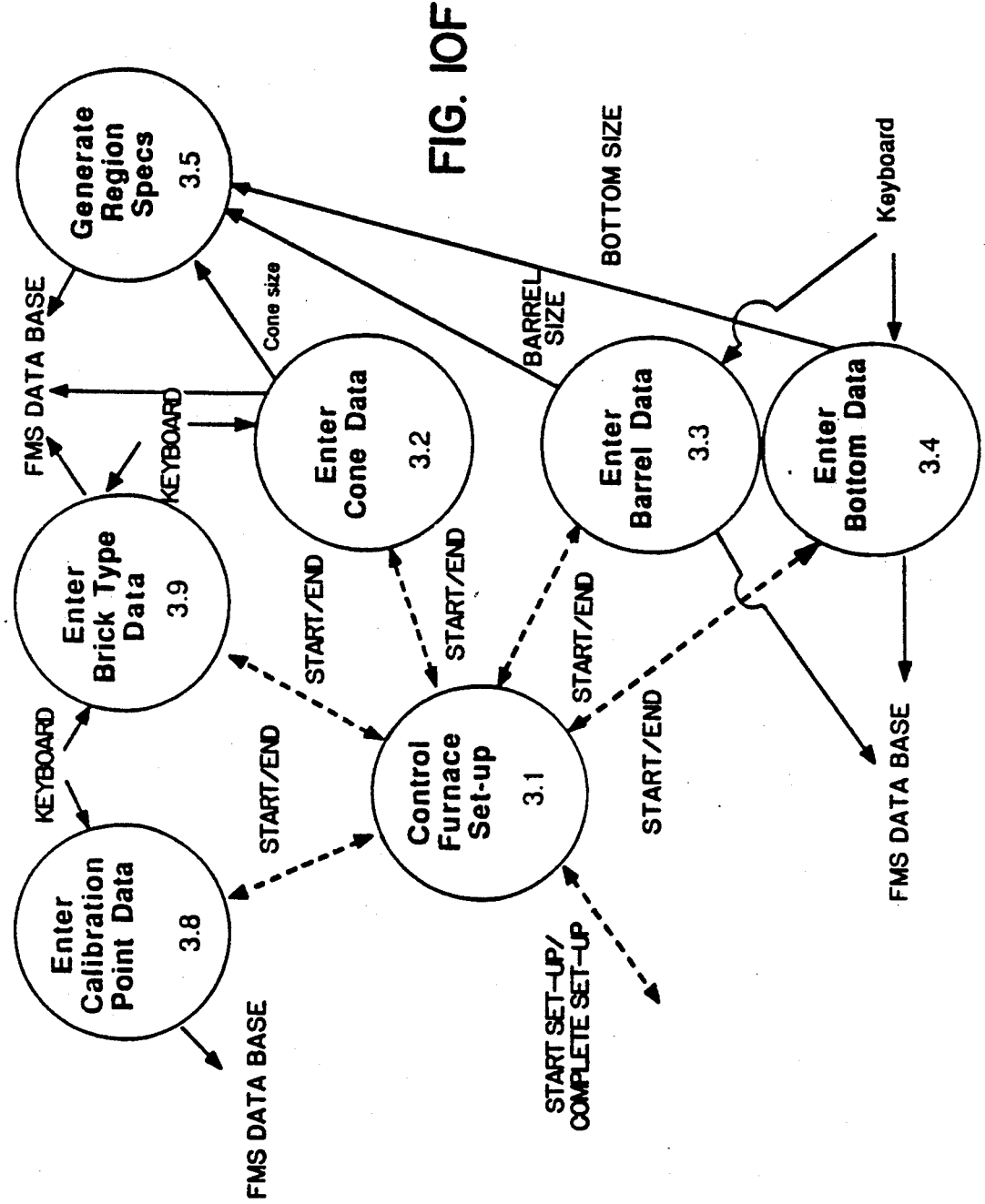

A top-level data flow diagram and next-lower-level data flow diagrams that further illustrate the organization and operation of the furnace measurement software system are shown in FIG. 10C and FIGS. 10D-10F. As seen in FIG. 10C, data (shown by solid lines) and control signals (shown by dashed lines) are exchanged among three major operator control 1.0, measure furnace 2.0 and set-up furnace 3.0 tasks and the computer operating system, as well as the measurement database, the monitor 16 and keyboard 28. FIG. 10D shows a lower level data flow diagram indicating the data and commands exchanged for the operator control task 1.0. FIG. 10E shows a lower level data flow diagram indicating the data and commands exchanged for the measure furnace task 2.0. FIG. 10F shows a lower level data flow diagram indicating the data and commands exchanged for the set-up furnace task 3.0.

As described above, the basis for the present system's 2½-D image processing is a model of the furnace that is entered by the operator under the "Set-up a New BOF Campaign" procedure. FIGS. 11A-11C show menu displays on the monitor 16 that would be presented to the operator for guidance during BOF model entry. Thus, the present system prompts the operator to follow predetermined conventions for model definition.

Referring to FIG. 11A, the display generally comprises a schematic BOF that is divided into a cone section 2, a barrel section 3, a stadium section 4 and a bottom section 5. The operator preferably would enter data, such as the starting points of the several sections, from the furnace engineering drawings while moving from top to bottom by actuating the cursor key on the system keyboard or by using a mouse. Also presented on the menu are a number of button icons F1-F8 that control operation of the model entry process and an area for help messages to the operator.

Figure 11B:
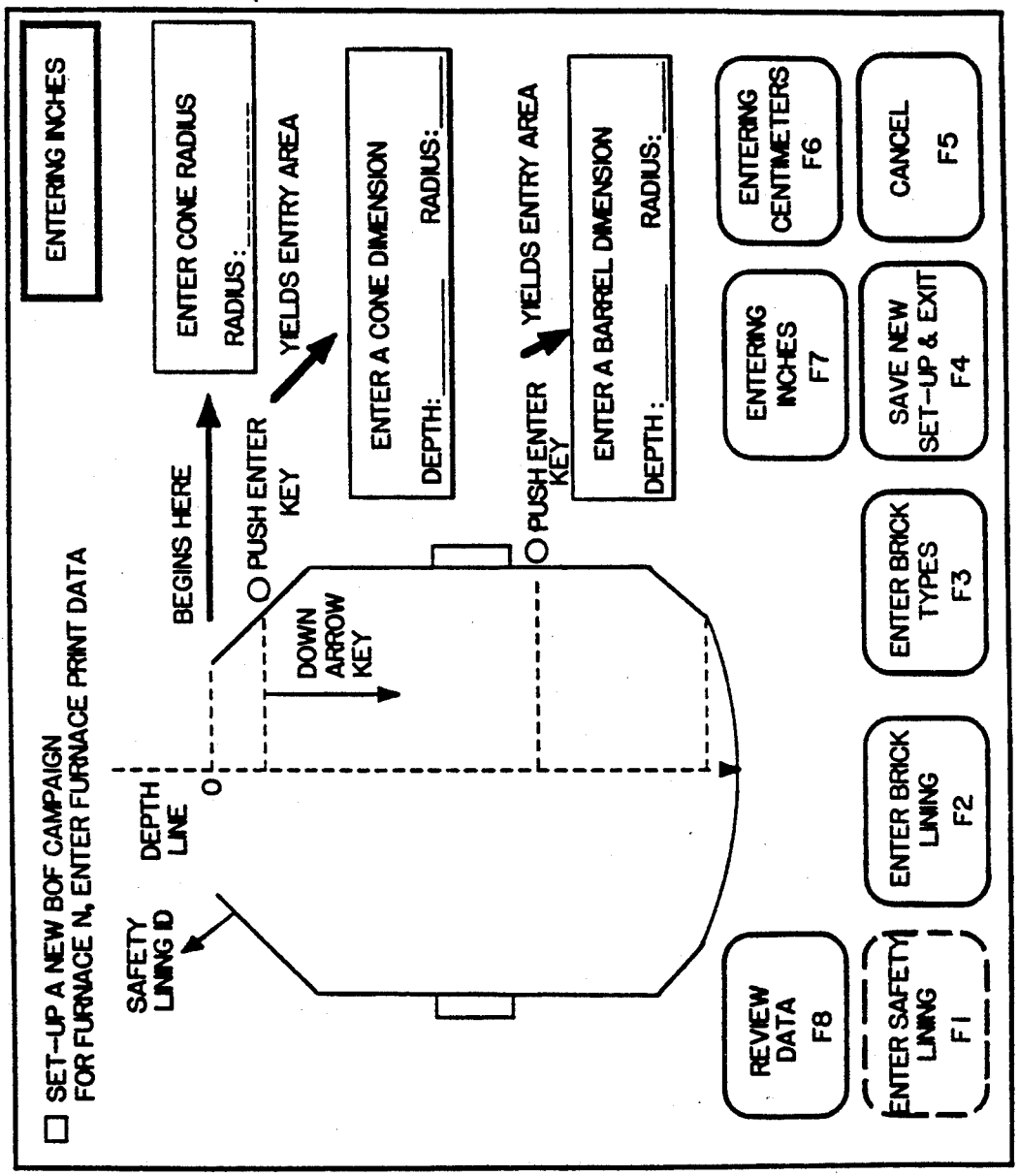
Figure 11C:
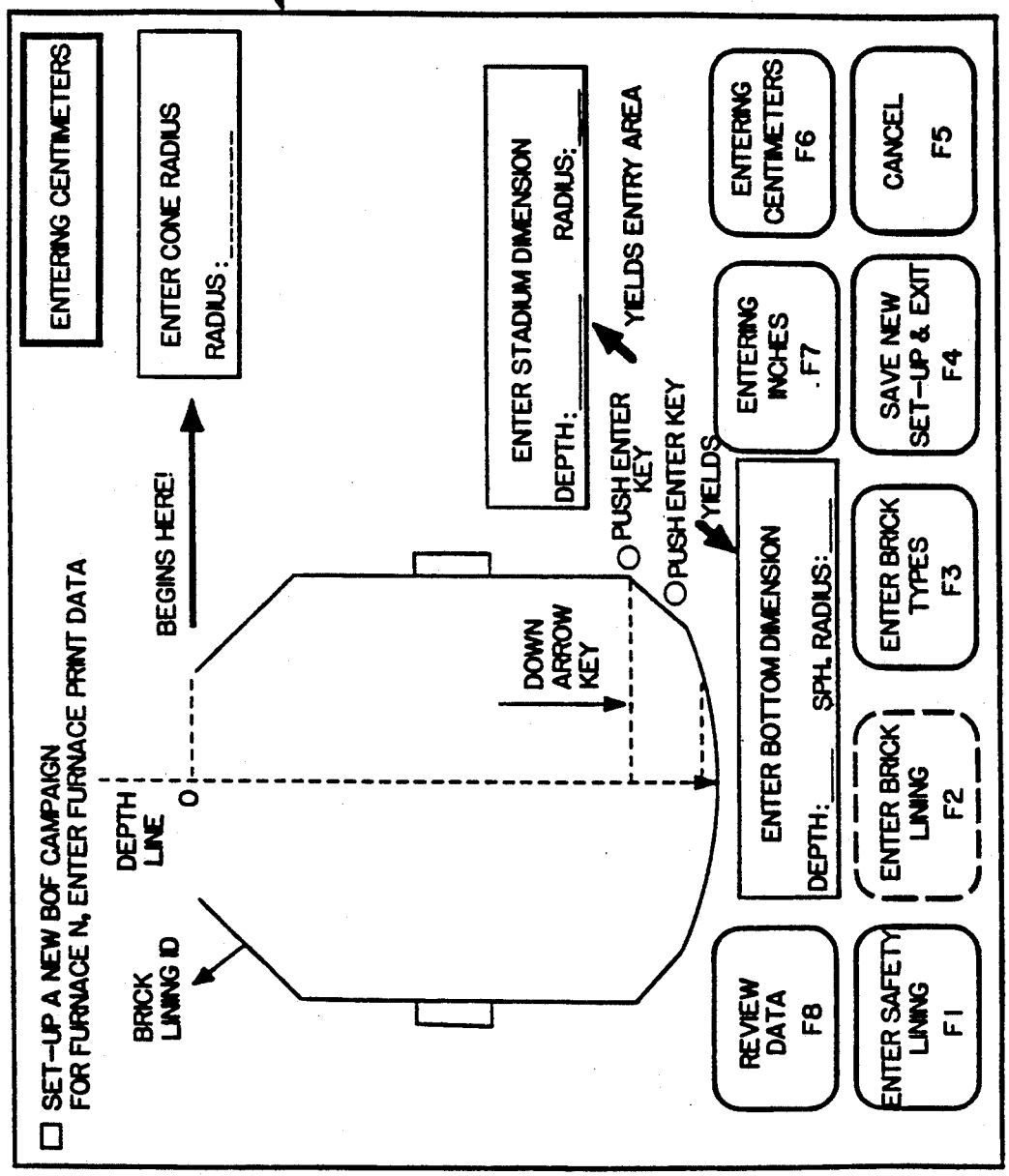

As seen from FIGS. 11B and 11C, model entry typically comprises two steps entry of data representing the inner and outer diameters of the middle safety lining of the BOF, and entry of data representing the inner working lining. The steps are executed by actuating the appropriate button on the keyboard or clicking the mouse on the button icon, as indicated by the shaded icons in the figures. As the operator moves the cursor down through the BOF model, data is entered by actuating the "enter" key, thereby causing an appropriate window to appear in the display. For example in FIG. 11B, actuating the "enter" key while the cursor is at the top of the BOF causes a window requesting the size of the furnace mouth to appear. Actuating the "enter" key while the cursor is within the cone area 2 causes a window requesting cone dimensions to appear. Similar windows are generated for the several sections of the BOF for both the safety lining and the working lining and for entry of other furnace data such a the types of bricks used in the different sections.

It is, of course, possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A thickness measurement system comprising:
   means for imaging an object, wherein the imaging means generates a plurality of data values representing distances from the imaging means to respective points on the object; and
   means for processing the data values generated by the imaging means, wherein the processing means comprises:
   means for protruding a measured 2½-D model of a surface of the object, comprising means for making a first object origin congruent with a second object origin, the first object origin being determined by first data points collected by the imaging means from a first position relative to the object, the second object origin being determined by second data points collected by the imaging means from a second position relative to the object, whereby data values collected by the imaging means from the first position may be combined with data values collected by the imaging means from the second position to produce the measured 2½-D model;
   means for entering a predetermined 2½-D mathematical model of the object; and
   first comparing means for comparing the measured 2½-D model to the predetermined 2½-D model to determine the object's thickness.

2. The thickness measurement system of claim 1, wherein the processing means further comprises:
   means for storing a plurality of thicknesses determined by the comparing means from respective data values generated by the imaging means from respective locations of the object with respect to the imaging means; and
   second comparing means for comparing the plurality of thicknesses to a previously stored plurality of thicknesses.

3. The thickness measurement system of claim 1, wherein the comparing means comprises:
   means for establishing an object reference coordinate system; and
   means for calibrating the imaging means's location with respect to the object in the object reference coordinate system.

4. The thickness measuring system of claim 1, wherein said imaging means includes an imaging laser radar and a shutter module.

5. The thickness measuring system of claim 4, wherein said imaging means includes a positioner module having at least two tilt sensors.

6. The thickness measuring system of claim 4, wherein said imaging laser radar includes an electronic phase detector for measuring a phase difference between a transmitted laser signal and a signal reflected by the object and received by said imaging laser radar, said phase difference being proportional to object distance.

7. The thickness measuring system of claim 1, further comprising a means for moving said imaging means to different heights to ensure adequate measurement of the sides of an object.

8. The thickness measuring system of claim 1, further comprising a mobile rack for housing said system.

9. The thickness measuring system of claim 8, wherein said imaging means is separable from said rack to permit remote imaging of an object.

10. The thickness measuring system of claim 1, wherein said processing means further comprises a video color display and a color line printer.

11. The thickness measuring system of claim 1, further comprising means for cooling said system, wherein the cooling means includes means for radiation shielding and electronic cooling module.

12. The thickness measuring system of claim 1, wherein said imaging means generates data values representing reflectances of respective points on the object.

13. The thickness measuring system of claim 1, further comprising:
   at least two tilt sensors for measuring tilt of said imaging means; and
   means for determining azimuth and elevation of at least two points on the object relative to said measuring system in a spherical coordinate system,
   wherein said processing means includes:
   means for transforming the azimuth and elevation of said at least two points determined by said determining means into a cartesian coordinate system;
   means for eliminating tilt measured by said at least two tilt-sensors from said transformed azimuth and elevation;
   means for calculating a yaw value in the cartesian coordinate system of measurement system; and
   means for determining a position of the imaging means in the cartesian coordinate system relative to said object.

14. The thickness measuring system of claim 13, wherein said processing means further comprises means for transforming said cartesian coordinate system into an object-reference coordinate system.

15. The thickness measuring system of claim 1, wherein said processing means includes means for interfacing with an external device to control at least one operation of said external device according to the object thickness determined by said comparing means.

16. A method of measuring the thickness of an object, said method comprising the steps of:
   providing an electro-optic distance measuring device capable of transmitting a radiation signal of narrow frequency bandwidth, receiving a portion of said transmitted radiation signal reflected by said object, and determining by phase comparison of the transmitted and received signals the distance from the electro-optical distance measuring device to a point of reflection on the object;
   determining a multitude of distance values to respective points on said object;
   modelling by a 2½-D modelling process the object's actual surface from the multitude of distance values, the step of modelling including the step of:
   making a first object origin congruent with a second object origin, the first object origin being determined by first data points collected by the imaging means from a first position relative to the object, the second object origin being determined by second data points collected by the imaging means from a second position relative to the object, whereby data values collected by the imaging means from the first position may be combined with data values collected by the imaging means from the second position to produce the 2½-D model of the object's actual surface;

comparing the object's modelled actual surface with a predetermined 2½-D modelled object surface; and outputting the results of said comparison.

17. The method of claim 16, wherein said actual surface modelling step further comprises the steps of:

establishing a coordinate system relative to the object;

determining said distance values in a coordinate system relative to said electro-optic distance measuring device; and transforming the distance values in the electro-optic distance measuring device coordinate system into said coordinate system relative to the object.

18. The method of claim 17, wherein said step of establishing a coordinate system relative to the electro-optic distance measuring device includes the step of determining distance values to at least two points on the object.

19. The method of claim 17, wherein said step of determining distance values includes the steps of;

measuring tilt of said electro-optic distance measuring device;

determining azimuth and elevation of at least two points on the object relative to said electro-optic distance measuring device in a spherical coordinate system;

transforming the azimuth and elevation of said at least two points determined by said determining means into a cartesian coordinate system; and eliminating the measured tilt from the azimuth and elevation of said at least two points.

20. The method of claim 18, wherein said step of transforming distance values in the electro-optic distance measuring device coordinate system includes the steps of:

measuring said at least two points on the object relative to a first position of said electro-optic distance measuring device;

moving the electro-optic distance measuring device to a second position;

measuring said at least two points on the object relative to said second position of said electro-optic distance measuring device;

calculating a yaw value of the electro-optic distance measuring device with respect to said electro-optic distance measuring device coordinate system based on the first and second position measurements;

determining said electro-optic distance measuring device position relative to said object; and transforming said electro-optic distance measuring device coordinate system to said object coordinate system based on the determined position of said electro-optic distance measuring device.

* * * * *

UNITED STATES PATENT AND TRADEMARK OFFICE
CERTIFICATE OF CORRECTION

PATENT NO. : 5,212,738
DATED : May 18, 1993
INVENTOR(S) : Chande, et al

It is certified that error appears in the above-indentified patent and that said Letters Patent is hereby corrected as shown below:

On the title page, Item [75]: Inventors, "Chande" should read "Chandé".

Column 9, line 9: "show" should be "shown".

Column 12, line 39: "FIGS. 9 and 9C" should be --FIGS. 9B and 9C--.

Column 14, line 67: "data such a" should be --data such as--.

Column 15, line 20: "means for protruding" should be --means for producing--

Signed and Sealed this

First Day of March, 1994

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO.    :    5,212,738

DATED    :    May 18, 1993

INVENTOR(S)    :    Chandé et al.

It is certified that error appears in the above-identified patent and that said Letters Patent is hereby corrected as shown below:

Column 9, line 33: the equations should be corrected as follows:

$$a = (y_1-y_0)(z_2-z_0) - (y_2-y_0)(z_1-z_0)$$
$$b = (z_1-z_0)(x_2-x_0) - (z_2-z_0)(x_2-x_0)$$
$$c = (x_1-x_0)(y_2-y_0) - (x_2-x_0)(y_1-y_0)$$

Column 9, line 48: the equations should be corrected as follows:

$$d = 2(x_1-x_0)$$
$$e = 2(y_1-y_0)$$
$$f = 2(z_1-z_0)$$

Signed and Sealed this

Seventh Day of June, 1994

Attest:

BRUCE LEHMAN

*Attesting Officer*    *Commissioner of Patents and Trademarks*